US012766816B2

(12) United States Patent
Morimoto et al.

(10) Patent No.: US 12,766,816 B2
(45) Date of Patent: Oct. 20, 2026

(54) HEAT-RAY REFLECTING SUBSTRATE AND WINDOW GLASS

(71) Applicants: AGC Inc., Tokyo (JP); AGC GLASS EUROPE, Louvain-la-Neuve (BE)

(72) Inventors: Yasuo Morimoto, Tokyo (JP); Akira Kumagai, Tokyo (JP); Mohsen Yousefbeiki, Louvain-la-neuve (BE)

(73) Assignees: AGC Inc., Tokyo (JP); AGC GLASS EUROPE, Louvain-la-neuve (BE)

( * ) Notice: Subject to any disclaimer, the term of this patent is extended or adjusted under 35 U.S.C. 154(b) by 43 days.

(21) Appl. No.: 18/954,730

(22) Filed: Nov. 21, 2024

(65) Prior Publication Data

US 2025/0083417 A1 Mar. 13, 2025

Related U.S. Application Data

(63) Continuation of application No. PCT/JP2023/017335, filed on May 8, 2023.

(30) Foreign Application Priority Data

May 27, 2022 (JP) ................................ 2022-087165

(51) Int. Cl.
*B32B 17/10* (2006.01)

(52) U.S. Cl.
CPC .. *B32B 17/10449* (2013.01); *B32B 2307/204* (2013.01); *B32B 2307/416* (2013.01)

(58) Field of Classification Search
None
See application file for complete search history.

(56) References Cited

U.S. PATENT DOCUMENTS 10,978,777 B1 * 4/2021 Jiang ................ B32B 17/10229
2013/0295300 A1 11/2013 Paulus
(Continued)

FOREIGN PATENT DOCUMENTS

JP 2017-186251 A 10/2017
WO WO 2019/189042 A1 10/2019
(Continued)

OTHER PUBLICATIONS

International Search Report issued Jul. 11, 2023 in PCT/JP2023/017335 filed on May 8, 2023, 2 pages.

*Primary Examiner* — Kim S. Horger
(74) *Attorney, Agent, or Firm* — Oblon, McClelland, Maier & Neustadt, L.L.P.

(57) ABSTRACT

The present invention relates to a heat-ray reflecting substrate including: a dielectric substrate; and a heat-ray reflecting film formed on at least one main surface of the dielectric substrate, in which the heat-ray reflecting substrate has a radio-wave transmitting region in at least a part of the at least one main surface in a plan view, the radio-wave transmitting region includes a first repeating pattern formed of a slit portion, the first repeating pattern includes at least two first unit patterns extending along a first axis direction, each of the first unit patterns includes a first line portion extending in the first axis direction, and a first connection portion provided on at least one end portion of the first line portion and connected to another first unit pattern, and the first connection portion includes a portion extending in a second axis direction.

20 Claims, 13 Drawing Sheets

(56) References Cited

U.S. PATENT DOCUMENTS

| | | | |
|---|---|---|---|
| 2015/0202719 A1 | 7/2015 | Wohlfeil et al. | |
| 2021/0129495 A1 | 5/2021 | Asai et al. | |
| 2021/0191011 A1 | 6/2021 | Morita et al. | |
| 2022/0264705 A1* | 8/2022 | Nielsen | B32B 17/1077 |

FOREIGN PATENT DOCUMENTS

| | | | |
|---|---|---|---|
| WO | WO 2020/054762 A1 | 3/2020 | |
| WO | WO-2021037467 A1 * | 3/2021 | E06B 3/673 |

* cited by examiner

4/13

(A)

(B)

HEAT-RAY REFLECTING SUBSTRATE AND WINDOW GLASS

TECHNICAL FIELD

The present invention relates to a heat-ray reflecting substrate and a window glass.

BACKGROUND ART

In recent years, it is a common practice to reduce electric power consumption, for example, by moderately using air conditioners or the like for cooling, in order to prevent the global warming. An attempt is being made accordingly to impart a function of reflecting heat rays (infrared rays) to windows of vehicles, buildings, or the like to thereby reduce an intake of heat from sunlight to the inside of the vehicles or buildings.

Examples of methods for imparting a heat-ray reflecting function to windows or the like include a method of forming, on a substrate such as a glass, a thin film (heat-ray reflecting film) containing a metal having the heat-ray reflecting function, such as silver.

In a case where a substrate having a heat-ray reflecting function is applied, for example, to a window glass, high transmissibility to radio waves having a predetermined frequency is also required. An example of a method for transmitting radio waves having frequencies in a range of several hundred MHz to several tens of GHz or more, such as radio waves for use in recent fourth-generation mobile communication systems (4G) and fifth-generation mobile communication systems (5G) includes partially removing a heat-ray reflecting film coating a substrate by laser etching or other methods.

As a method for favorably transmitting radio waves having predetermined frequencies or the like while retaining a heat-ray reflecting function, it is known to remove a heat-ray reflecting film such that a portion where the heat-ray reflecting film is not present forms a periodic pattern implemented by a plurality of lines, for example, forms a parallel line pattern or a grid-like pattern.

When removing a heat-ray reflecting film by laser etching, there is generally a limit to a size of a region that can be laser processed in one step. For example, Patent Literature 1 describes a method for laser processing a relatively large region relatively quickly in one step, but a size of the region that can be laser processed in the one step may still be insufficient for a size of the entire region to be processed. Therefore, when a region larger than the region that can be processed in one step is to be laser processed, a pattern formed to a predetermined size that can be processed in one step is formed a plurality of times and arranged continuously. Accordingly, a continuous pattern can be formed over the entire desired region, like a patchwork.

In this case, in order to avoid impairing radio-wave transmissibility and an aesthetic appearance, it is ideal that there is no interruption or deviation of a plurality of patterns at a joint between the patterns formed in different steps. However, it is difficult to completely control a pattern forming position, and it is necessary to consider that there may be some errors in the pattern forming position during laser processing. In particular, since an interruption in the pattern is likely to impair the radio-wave transmissibility, in order to prevent the interruption, it is required to connect the patterns as reliably as possible.

In this regard, for example, when forming a grid-like pattern, a plurality of grid patterns formed in different steps can be arranged in a partially overlapping manner, thereby preventing the interruption of the pattern which impairs the radio-wave transmissibility. Patent Literature 2 describes that a first grid plane is connected to a closed comb structure of a second grid plane via an open comb structure, thereby preventing deviations such as double lines in an overlapping region and a region where coating is not removed.

CITATION LIST

Patent Literature

Patent Literature 1: US2013/0295300A1
Patent Literature 2: JP2017-186251A

SUMMARY OF INVENTION

Technical Problem

However, in the technique described in Patent Literature 2, for example, when forming a parallel line pattern, it is difficult to prevent an interruption between a plurality of patterns formed in different steps, and there is a limit to freedom in the pattern that can be selected.

Therefore, an object of the present invention is to provide a heat-ray reflecting substrate that has high freedom in selecting a pattern that can be formed in a radio-wave transmitting region by a portion where a heat-ray reflecting film is not present, and has excellent reliability by preventing an interruption in the pattern, and to provide a window glass including the heat-ray reflecting substrate.

Solution to Problem

As a result of an extensive research, the present inventors have discovered that the above problem can be solved by forming a pattern into a predetermined shape at a radio-wave transmitting region by using a portion where a heat-ray reflecting film is not present, and have completed the present invention.

That is, the present invention relates to the following 1 to 19.

1. A heat-ray reflecting substrate including:

a dielectric substrate; and a heat-ray reflecting film formed on at least one main surface of the dielectric substrate, in which the heat-ray reflecting substrate has a radio-wave transmitting region in at least a part of the at least one main surface in a plan view, the radio-wave transmitting region includes a first repeating pattern formed of a slit portion where the heat-ray reflecting film is not present, the first repeating pattern includes at least two first unit patterns extending along a first axis direction, each of the first unit patterns includes a first line portion extending in the first axis direction, and a first connection portion provided on at least one end portion of the first line portion and connected to another first unit pattern of the at least two first unit patterns, and the first connection portion includes a portion extending in a second axis direction different from the first axis direction, and at least a part of the first connection portion is connected to the first line portion.

2. The heat-ray reflecting substrate according to 1, in which an angle θ (°) between the first axis direction and the second axis direction is 10°≤θ≤120°.

3. The heat-ray reflecting substrate according to 1 or 2, in which
the first connection portion is provided on each of two end portions of the first line portion.
4. The heat-ray reflecting substrate according to any one of 1 to 3, in which
the radio-wave transmitting region includes a plurality of the first repeating patterns aligned in parallel.
5. The heat-ray reflecting substrate according to 4, in which
an interval between the first repeating patterns is 100 μm to 10 mm.
6. The heat-ray reflecting substrate according to 4 or 5, in which
the first connection portion is not connected to another adjacent first repeating pattern.
7. The heat-ray reflecting substrate according to any one of 4 to 6, in which
a length of a component, which is perpendicular to the first axis direction, of the first connection portion is 10% to 80% of an interval between the first repeating patterns.
8. The heat-ray reflecting substrate according to any one of 1 to 7, in which
each of the first unit patterns is axially symmetric or rotationally symmetric.
9. The heat-ray reflecting substrate according to any one of 1 to 8, in which
the radio-wave transmitting region further includes a second repeating pattern formed of the slit portion,
the second repeating pattern includes at least two second unit patterns along a third axis direction different from the first axis direction,
each of the second unit patterns includes a second line portion extending in the third axis direction, and a second connection portion provided on at least one end portion of the second line portion and connected to another second unit pattern of the at least two second unit patterns, and
the second connection portion includes a portion extending in a fourth axis direction different from the third axis direction, and at least a part of the second connection portion is connected to the second line portion.
10. The heat-ray reflecting substrate according to 9, in which
an angle θ (°) between the third axis direction and the fourth axis direction is $10° \leq \theta \leq 120°$.
11. The heat-ray reflecting substrate according to 9 or 10, in which
the second connection portion is provided on each of two end portions of the second line portion.
12. The heat-ray reflecting substrate according to any one of 9 to 11, in which
the radio-wave transmitting region includes a plurality of the second repeating patterns aligned in parallel.
13. The heat-ray reflecting substrate according to 12, in which
an interval between the second repeating patterns is 100 μm to 10 mm.
14. The heat-ray reflecting substrate according to 12 or 13, in which
the second connection portion is not connected to another adjacent second repeating pattern.
15. The heat-ray reflecting substrate according to any one of 12 to 14, in which
a length of a component, which is perpendicular to the third axis direction, of the second connection portion is 10% to 80% of an interval between the second repeating patterns.
16. The heat-ray reflecting substrate according to any one of 9 to 15, in which
each of the second unit patterns is axially symmetric or rotationally symmetric.
17. The heat-ray reflecting substrate according to any one of 9 to 16, in which
the radio-wave transmitting region includes a quadrangular pattern formed of the two adjacent first repeating patterns aligned in parallel and the two adjacent second repeating patterns aligned in parallel, and at least one of the first connection portion and the second connection portion is located on a midpoint of at least one side forming the quadrangular shape.
18. The heat-ray reflecting substrate according to any one of 1 to 17, in which
the radio-wave transmitting region has a radio-wave transmission loss of 3 dB or less with respect to a radio wave having a frequency of 28 GHz.
19. A window glass including the heat-ray reflecting substrate according to any one of 1 to 18.

Advantageous Effects of Invention

According to the present invention, it is possible to more reliably connect a plurality of patterns formed in different steps for various patterns that may be formed in a portion where a heat-ray reflecting film is not present. Accordingly, a heat-ray reflecting substrate that has high freedom in selecting a pattern that can be formed in a radio-wave transmitting region, and has excellent reliability by preventing an interruption in the pattern, and a window glass including the heat-ray reflecting substrate can be provided.

DESCRIPTION OF EMBODIMENTS

Figure 1:
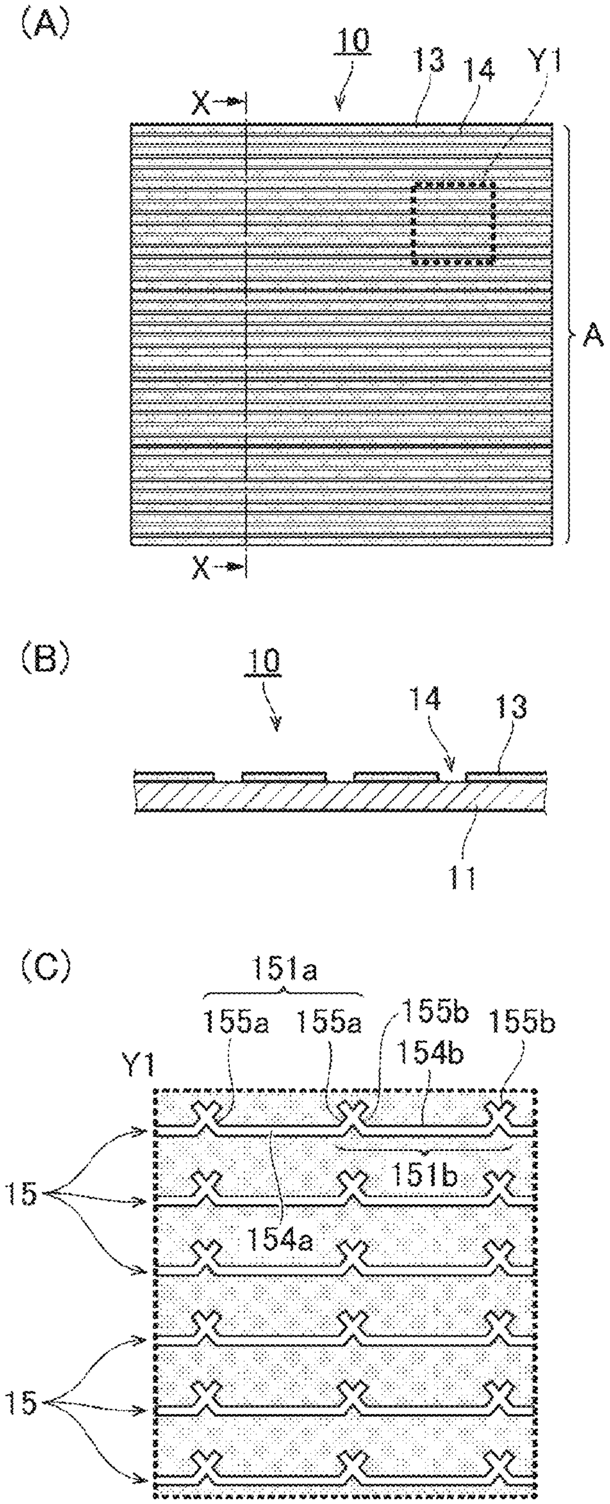
FIG. 1 is a diagram illustrating an embodiment of a heat-ray reflecting substrate.

Hereinafter, the present invention will be described in detail, but the present invention is not limited to the following embodiment and can be freely modified and implemented without departing from the gist of the present invention. In addition, "to" indicating a numerical range is used to include numerical values written before and after it as a lower limit value and an upper limit value. In the following drawings, members and portions having the same functions may be denoted by the same reference numerals, and duplicate descriptions may be omitted or simplified. The embodiments described in the drawings are schematically for the purpose of clearly illustrating the present invention, and do not necessarily accurately represent a size or a scale of an actual product. In the present specification, terms "perpendicular" and "parallel" are not intended to strictly follow definitions thereof, and some errors are permitted within a scope of obtaining an effect of the present invention. For example, when a certain straight line A is perpendicular or parallel to another straight line B, the straight line A may have an inclination of within ±20° compared to a case where the straight line A is strictly perpendicular or parallel to the straight line B.

A heat-ray reflecting substrate according to the present embodiment (hereinafter, referred to as "the present heat-ray reflecting substrate") includes: a dielectric substrate; and a heat-ray reflecting film formed on at least one main surface of the dielectric substrate, in which the heat-ray reflecting substrate has a radio-wave transmitting region on at least a part of the at least one main surface in a plan view, in which the radio-wave transmitting region includes a first repeating pattern formed of a slit portion where the heat-ray reflecting film is not present, the first repeating pattern includes at least two first unit patterns extending along a first axis direction, each of the first unit patterns includes a first line portion extending in the first axis direction, and a first connection portion provided on at least one end portion of the first line portion and connected to another first unit pattern of the at least two first unit patterns, and the first connection portion includes a portion extending in a second axis direction different from the first axis direction, and has at least a part connected to the first line portion.

Figure 2:
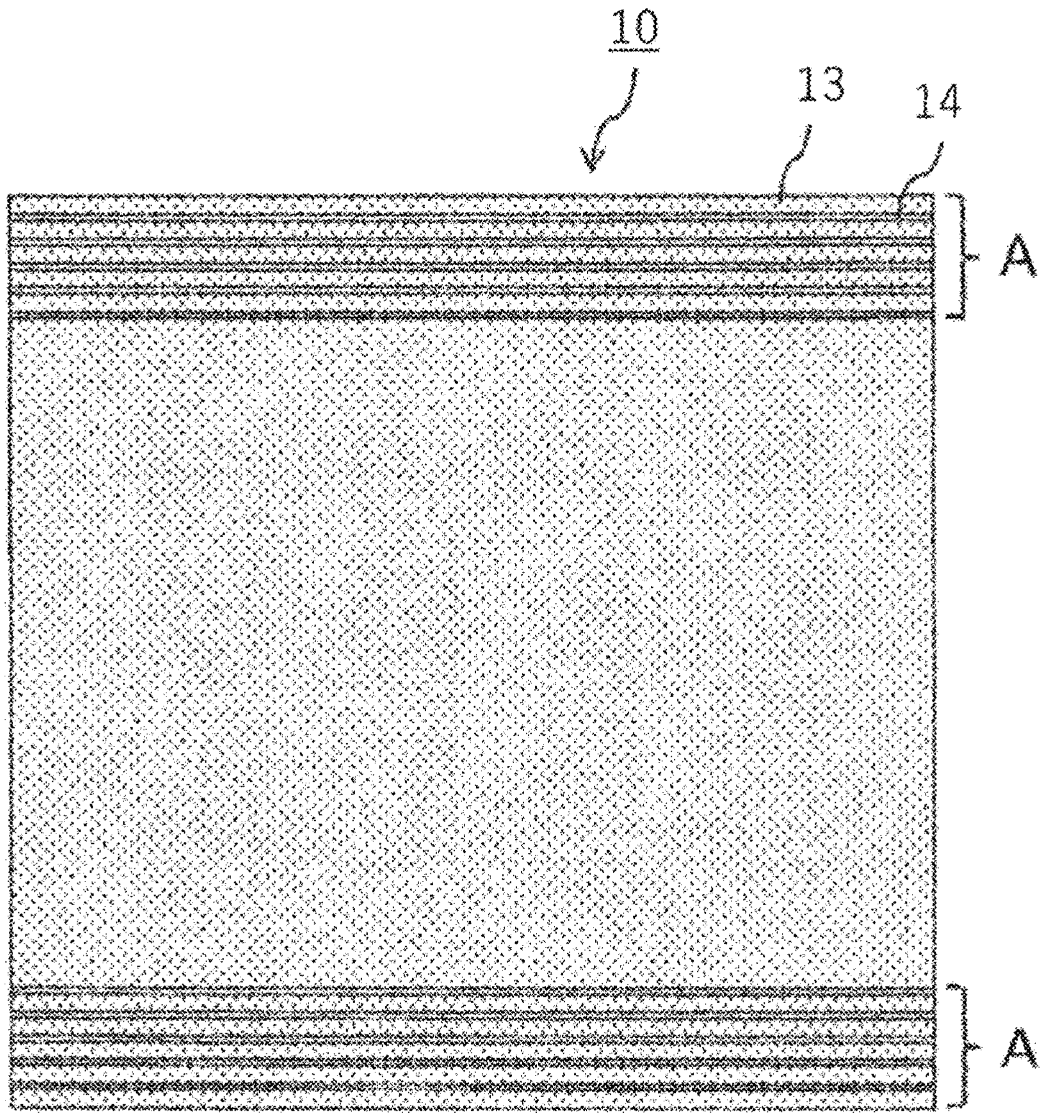
FIG. 2 is a diagram illustrating the embodiment of the heat-ray reflecting substrate.

FIG. 1 and FIG. 2 are diagrams illustrating an embodiment of the present heat-ray reflecting substrate. In FIG. 1, (A) is a top view of a heat-ray reflecting substrate, (B) is an enlarged diagram of a cross section taken along a line X-X in (A), and (C) is an enlarged diagram of a region Y1 in (A).

A heat-ray reflecting substrate 10 illustrated in FIG. 1 includes a dielectric substrate 11 and a heat-ray reflecting film 13 on at least one main surface of the dielectric substrate 11. A radio-wave transmitting region A is present in at least a part of the at least one main surface in a plan view. The radio-wave transmitting region A includes a slit portion 14 where the heat-ray reflecting film 13 is not present. Here, the radio-wave transmitting region refers to a region that has radio-wave transmissibility due to a predetermined pattern formed of the slit portion. In the example of FIG. 1, a substantially parallel line pattern formed of the slit portion 14 is formed on the entire surface of the main surface having the heat-ray reflecting film. Therefore, in the example of FIG. 1, the entire main surface provided with the heat-ray reflecting film 13 is the radio-wave transmitting region A in a plan view. On the other hand, as illustrated in FIG. 2, a part of the main surface on which the heat-ray reflecting film 13 is formed may be the radio-wave transmitting region A.

Figure 3:
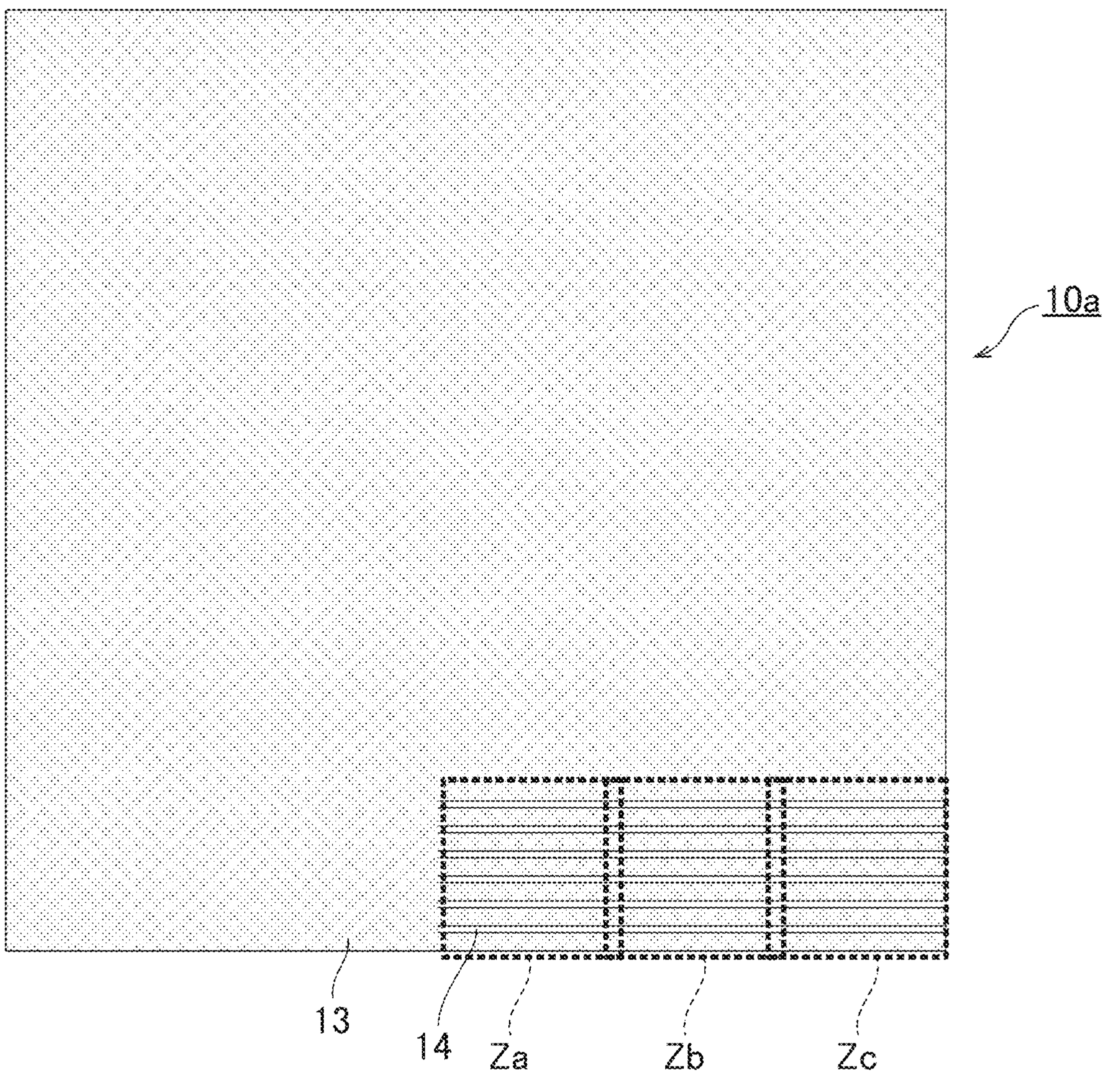
FIG. 3 is a diagram schematically illustrating a method for forming a continuous pattern.

Here, in FIG. 1, FIG. 2, and FIG. 3 (described later), the slit portion 14 forms a substantially parallel line pattern in which a plurality of first repeating patterns (described later) are aligned in parallel. However, in (A) and (B) of FIG. 1, FIG. 2, and FIG. 3, a specific shape of each of the first repeating patterns is omitted and is simply shown as a parallel line.

As described above, when the slit portion is formed by, for example, laser etching, there is a limit to a size of a region that can be laser processed in one step in many cases. Therefore, a pattern that matches a size of a unit processing region that can be processed in one step (hereinafter, also simply referred to as "unit processing region") is formed a plurality of times and arranged continuously to form a continuous pattern. FIG. 3 is a diagram schematically illustrating this method. In a heat-ray reflecting substrate 10*a* having the heat-ray reflecting film 13 on at least one main surface of a dielectric substrate, for example, by forming patterns (slit portions 14) in unit processing regions Za, Zb, and Zc in different steps and arranging the unit processing regions adjacent to each other in a partially overlapping manner, a continuous pattern can be formed in these three regions. Then, regarding regions other than Za, Zb, and Zc, patterns can be formed in unit processing regions and arranged continuously in the same manner repeatedly, and a continuous pattern can be formed in a desired region.

As described above, in the method illustrated in FIG. 3, it is difficult to completely control a pattern forming position, that is, a position where the unit processing region is disposed. Therefore, it is necessary to consider that some deviations occur in the pattern forming position during processing. In this regard, as a result of an intensive research, the present inventors have found that by configuring a shape of the pattern formed by the slit portion to include a predetermined repeating pattern, it is possible to more reliably connect a plurality of patterns formed in different steps, and have completed the present invention. According to the present heat-ray reflecting substrate, the pattern in the radio-wave transmitting region is prevented from being interrupted, and therefore reliability is excellent. Here, the interruption of the pattern refers to that physical continuity of the slit portion is interrupted. In addition, excellent reliability refers to that an unintended interruption in the pattern due to a deviation of the pattern forming position is prevented, and the radio-wave transmissibility of the radio-wave transmitting region is not easily impaired. According to the present heat-ray reflecting substrate, regarding a wide variety of pattern shapes, an effect of improving reliability can be obtained, and freedom in pattern selection according to desired properties or the like is increased. The present heat-ray reflecting substrate will be described in more detail below.

(First Repeating Pattern)

As described above, the heat-ray reflecting substrate 10 illustrated in FIG. 1 and FIG. 2 includes the dielectric substrate 11 and the heat-ray reflecting film 13 on at least one main surface of the dielectric substrate 11. A radio-wave transmitting region A is present in at least a part of the at least one main surface in a plan view. The radio-wave transmitting region A includes first repeating patterns 15 formed by the slit portions 14 where the heat-ray reflecting film 13 is not present.

The slit portion is a portion where at least the heat-ray reflecting film is not present in a plan view of the heat-ray reflecting substrate, and is partitioned by the heat-ray reflecting film. In other words, the slit portion is not covered with the heat-ray reflecting film, and the dielectric substrate may be exposed. Alternatively, the slit portion may include a film (another film) other than the heat-ray reflecting film (described later) on the dielectric substrate. A width of the slit portion can be adjusted as appropriate according to the desired radio-wave transmissibility, a device for forming the slit portion, or the like, and is preferably 20 μm or more, and more preferably 30 μm or more due to constraints of a processing process. On the other hand, the width of the slit portion is preferably 200 μm or less, more preferably 100 μm or less, and furthermore preferably 60 μm or less from viewpoints of visibility and heat insulation.

In FIG. 1, (C) is an enlarged diagram of the region Y1 in (A), and is a diagram illustrating a configuration of the first repeating patterns. Each of the first repeating patterns 15 includes at least two first unit patterns 151*a*, 151*b* extending along a first axis direction. The first unit patterns respectively include first line portions 154*a*, 154*b* extending along the first axis direction, and first connection portions 155*a*, 155*b* on at least one end portion of each of the first line portions and connected to another first unit pattern of the at least two first unit patterns. In other words, the first connection portion connects the first unit patterns, and the first connection portion 155*a* is connected to another first unit pattern 151*b*, and the first connection portion 155*b* is connected to another first unit pattern 151*a*. The first connection portions 155*a*, 155*b* each include a portion extending in a second axis direction different from the first axis direction, and at least a part of the first connection portion 155*a* is connected to the first line portion 154*a*, and at least a part of the first connection portion 155*b* is connected to the first line portion 154*b*. This refers to that the first line portion and the first connection portion are formed without interruption in one first unit pattern.

In the present heat-ray reflecting substrate, as the radio-wave transmitting region includes the first repeating pattern, the interruption of the pattern is suppressed to exhibit excellent reliability. One first repeating pattern can be equivalent to a single line extending along the first axis direction, as an example of an ideal continuous pattern. When forming a single line extending along the first axis direction in a plurality of steps, ideally, it is considered that a plurality of short lines extending along the first axis direction are continuously formed along the first axis direction. However, when considering a deviation of the pattern forming position, it is difficult to form an ideal single line without interruption. Even if the pattern forming positions are intentionally overlapped, if a positional deviation larger than the width of the slit portion occurs along a direction perpendicular to the first axis direction, the line is easily interrupted. In this regard, in the first repeating pattern described above, each of the first unit patterns includes the first line portion extending in the first axis direction and the first connection portion that has at least a part connected to the first line portion and includes a portion extending in the second axis direction different from the first axis direction. The first connection portion includes the portion extending in the second axis direction, so that even if the pattern forming position deviates in various directions, the deviation can be easily absorbed, and a heat-ray reflecting substrate in which the interruption of the pattern is prevented can be obtained.

The first repeating pattern is configured such that the first unit patterns are connected via the first connection portions along the first axis direction, and therefore an ideal single line cannot be formed. However, in the present embodiment, by properly connecting the patterns, good radio-wave transmissibility can be ensured in the radio-wave transmitting region. This is described by the following simulation results.

A simulation is conducted under the following conditions, assuming that a pattern in which the following patterns 1 to 3 are infinitely repeated in an X-axis direction and a Y-axis direction by the slit portions is formed on the radio-wave transmitting region.

(Conditions)

Figure 4:
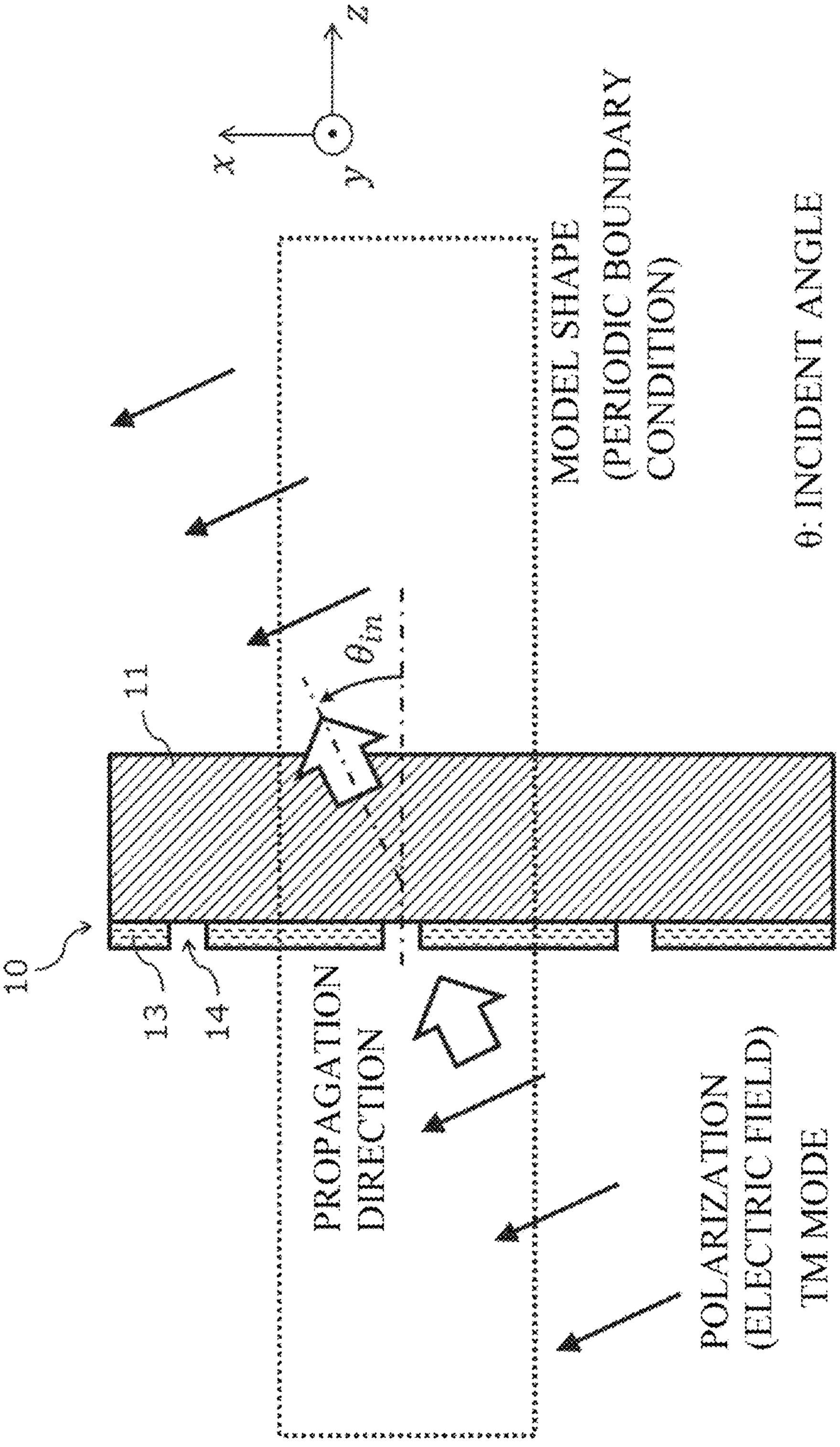
FIG. 4 is a diagram schematically illustrating conditions for a simulation.

FIG. 4 is a diagram schematically illustrating conditions for the simulation. FIG. 4 illustrates a cross-sectional diagram in a thickness direction of the heat-ray reflecting substrate 10 having the heat-ray reflecting film 13 and the slit portions 14 on one main surface of the dielectric substrate 11. The simulation is conducted for pass properties (radio-wave transmission properties) of radio waves (TM waves) when a linearly polarized plane wave having an electric field in an XZ plane is incident on the heat-ray reflecting substrate 10 at an angle $\theta_{in}$ in the XZ plane with respect to the dielectric substrate. In this case, the thickness of the heat-ray reflecting film is assumed to be 9 nm, an interval between adjacent parallel slit portions is 1 mm, and the width of the slit portion is assumed to be 50 μm. Software "HFSS" manufactured by ANSYS, Inc. is used in the simulation.

(Pattern 1)

A grid-like pattern is formed by overlapping an ideally continuous parallel line pattern including a plurality of straight lines extending along the X-axis direction with a pattern including a single ideally continuous straight line extending along the Y-axis direction perpendicular thereto.

(Pattern 2)

A grid-like pattern is formed by overlapping an ideally continuous parallel line pattern including a plurality of straight lines extending along the X-axis direction with a pattern including a straight line extending along the Y-axis direction perpendicular thereto. In the pattern 2, the single straight line extending along the Y-axis direction is interrupted near a midpoint of the single straight line by a grid-like pattern deviating by 50 μm in the X-axis direction, and is split into two.

(Pattern 3)

An ideally continuous parallel line pattern including a plurality of straight lines extending along the X-axis direction and a single first repeating pattern extending along the Y-axis direction perpendicular thereto are formed.

Figure 5A:
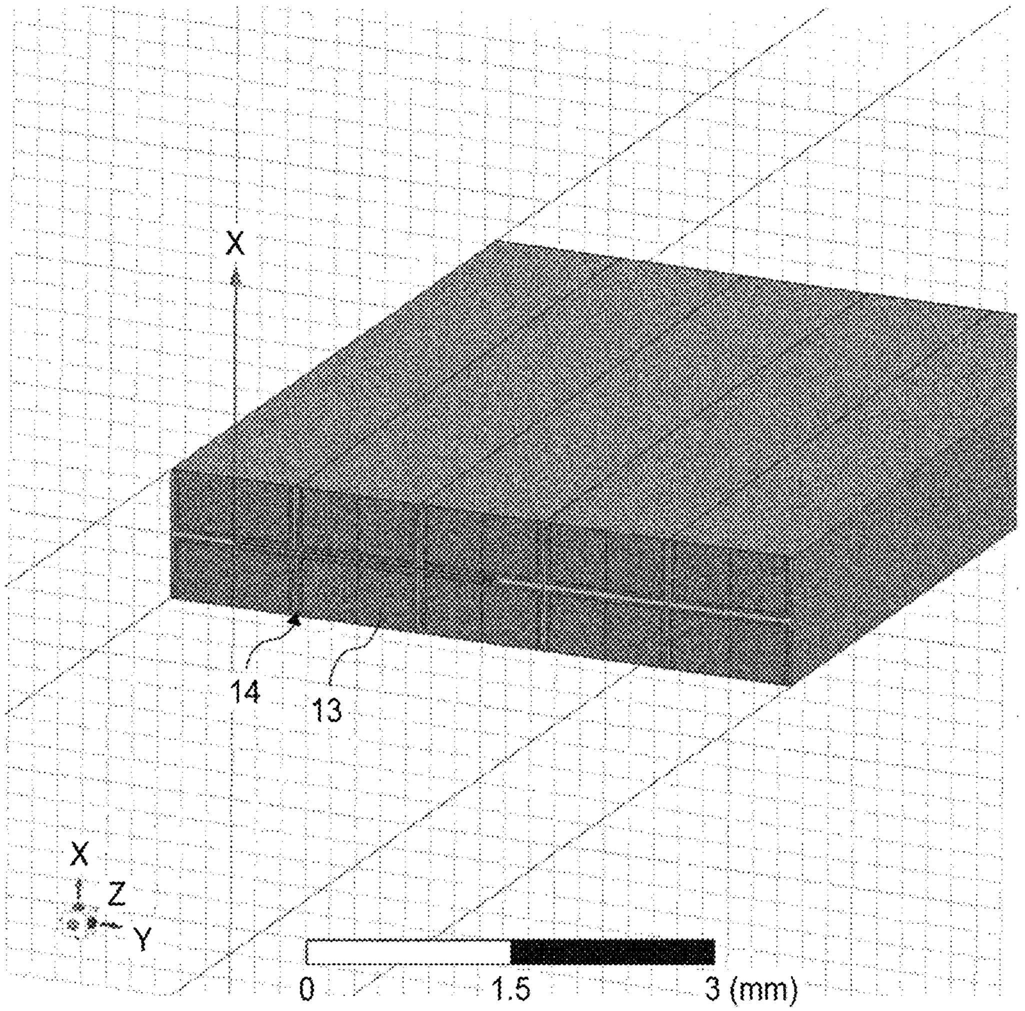
FIGS. 5A and 5B are diagrams illustrating simulation results of a pattern 1.
Figure 5B:
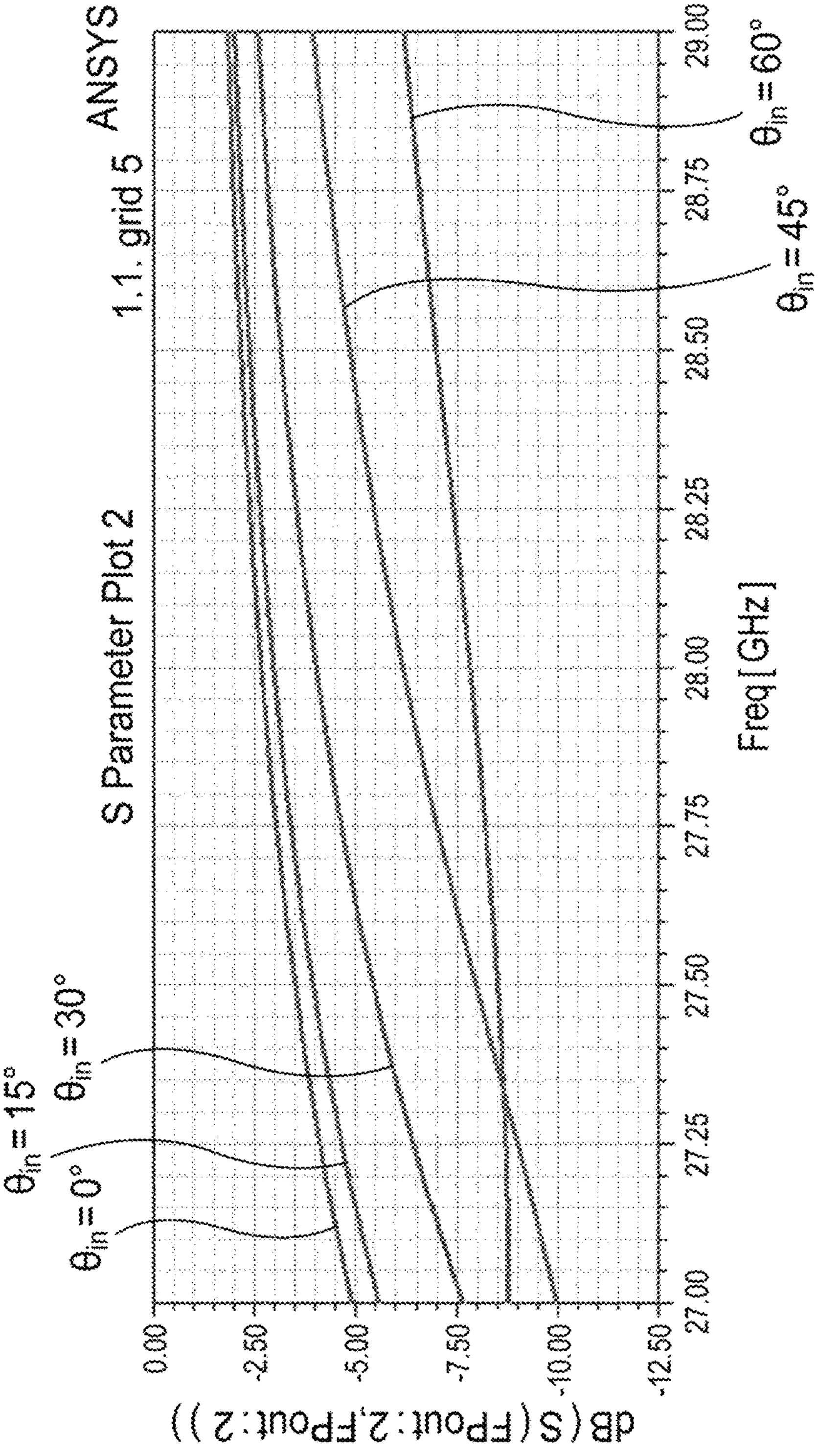
Figure 6A:
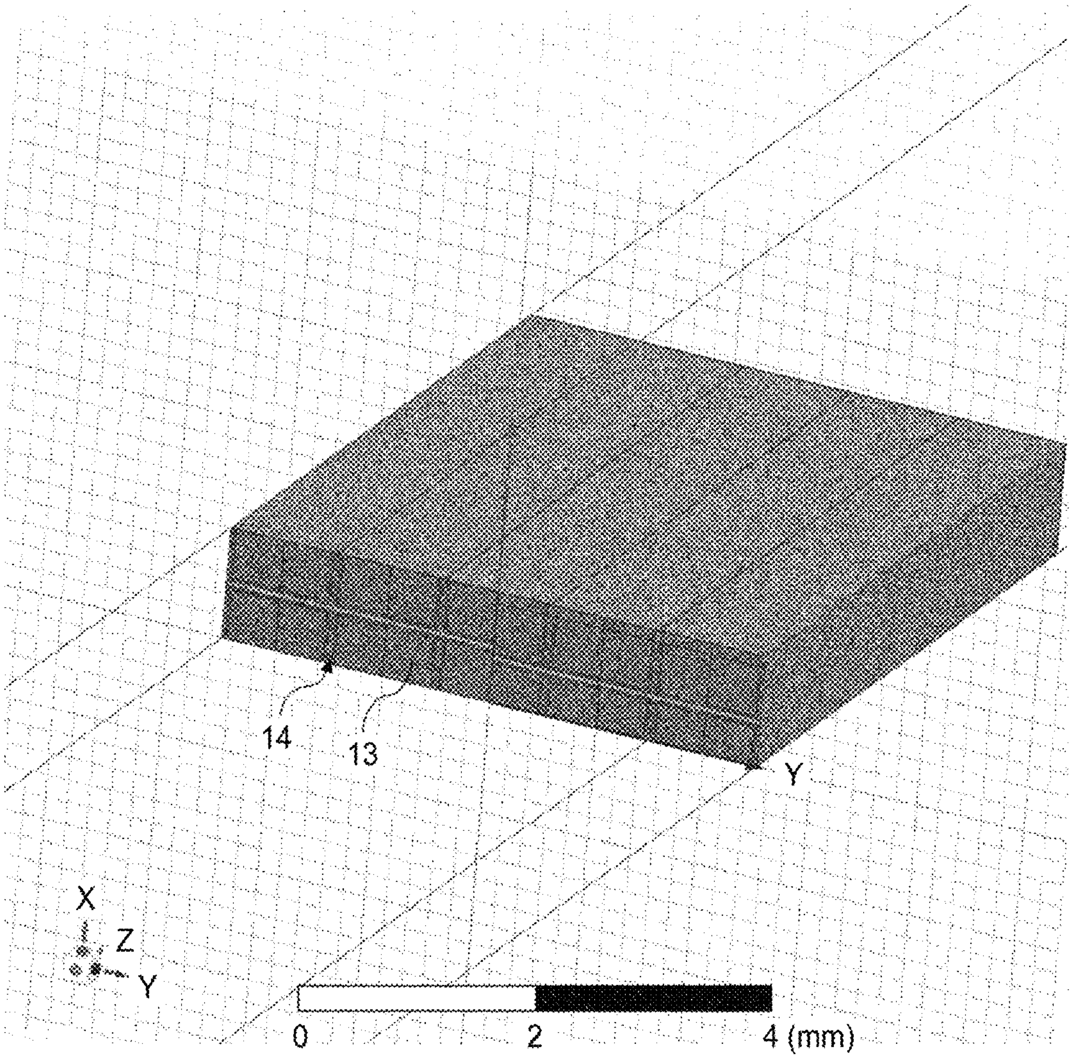
FIGS. 6A and 6B are diagrams illustrating simulation results of a pattern 2.
Figure 6B:
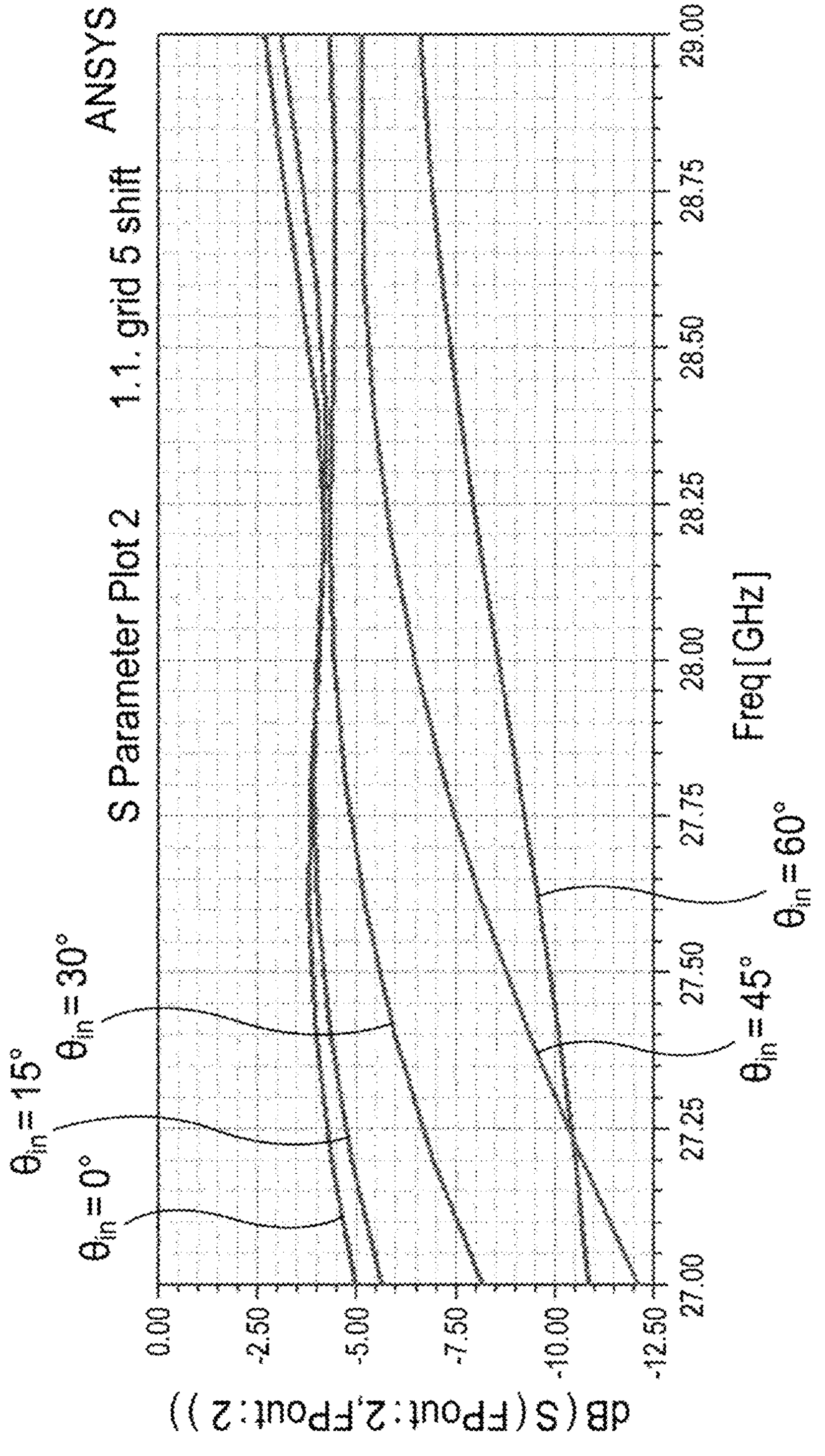
Figure 7A:
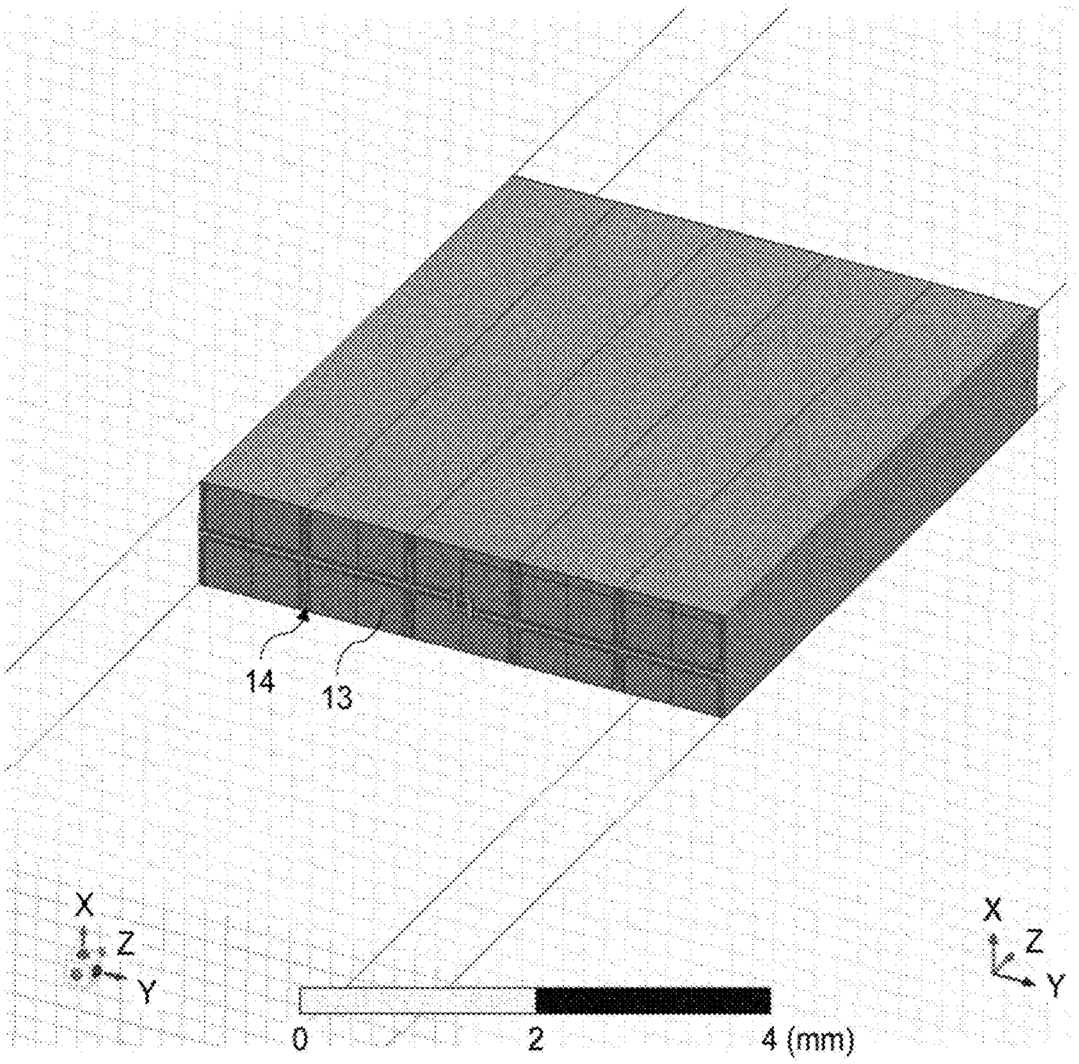
FIGS. 7A and 7B are diagrams illustrating simulation results of a pattern 3.
Figure 7B:
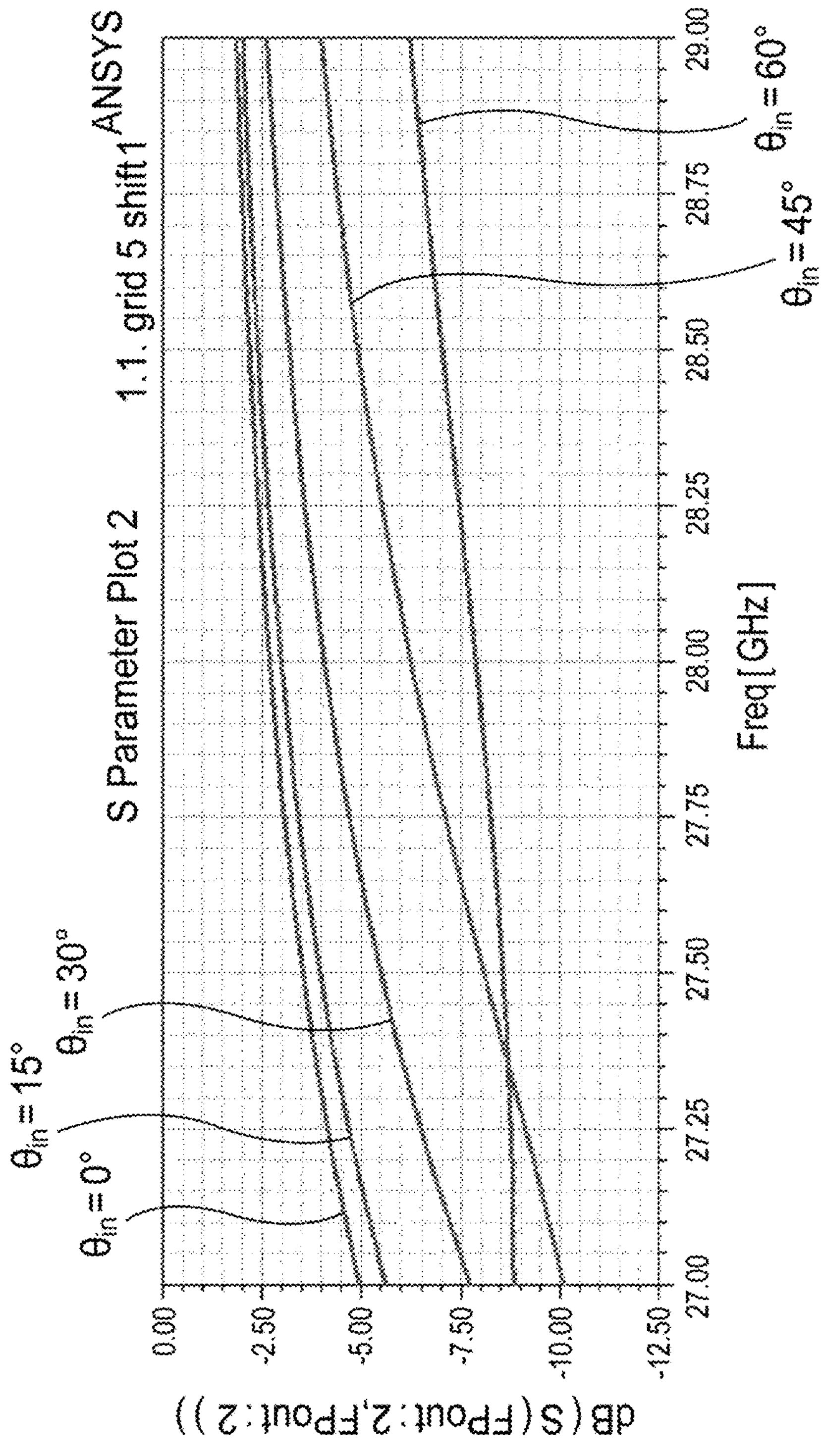

FIGS. 5A and 5B are diagrams illustrating the simulation results of the pattern 1, in which FIG. 5A is a diagram illustrating a configuration of the pattern 1, and FIG. 5B is a diagram illustrating radio-wave transmission properties of the pattern 1. FIGS. 6A and 6B are diagrams illustrating the simulation results of the pattern 2, in which FIG. 6A is a diagram illustrating a configuration of the pattern 2, and FIG. 6B is a diagram illustrating radio-wave transmission properties of the pattern 2. FIGS. 7A and 7B are diagrams illustrating the simulation results of the pattern 3, in which FIG. 7A is a diagram illustrating a configuration of the pattern 3, and FIG. 7B is a diagram illustrating radio-wave transmission properties of the pattern 3. Each of FIG. 5B, FIG. 6B, and FIG. 7B illustrates the radio-wave transmissibility for each frequency according to a value of $\theta_{in}$ for polarization in the X-axis direction. In each drawing, the smaller a value of a radio-wave transmission amount (dB) expressed as a negative value, that is, the larger an absolute value of the negative value, the larger a radio-wave transmission loss under that condition and the poorer the radio-wave transmission properties. Table 1 shows the radio-wave transmission amount at 28 GHz for each pattern and each incident angle $\theta_{in}$.

TABLE 1

| Incident angle $\theta_{in}$ | Pattern 1 | Pattern 2 | Pattern 3 |
|---|---|---|---|
| 0° | −2.7 dB | −4.1 dB | −2.7 dB |
| 15° | −3.0 dB | −4.0 dB | −3.0 dB |

TABLE 1-continued

| Incident angle $\theta_{in}$ | Pattern 1 | Pattern 2 | Pattern 3 |
|---|---|---|---|
| 30° | −4.0 dB | −4.4 dB | −4.1 dB |
| 45° | −6.2 dB | −6.5 dB | −6.2 dB |
| 60° | −7.8 dB | −8.6 dB | −7.9 dB |

According to FIGS. 5A and 5B, the pattern 1, which is an ideally continuous parallel line pattern, has pass properties of −2.7 dB at $\theta_{in}$=0° and −3.0 dB at $\theta_{in}$=15° at 28 GHz. Pass properties of the pattern 2 in which the straight line extending along the Y-axis direction deviates in the X-axis direction and is interrupted midway are degraded to −4.1 dB at $\theta_{in}$=0° and −4.0 dB at $\theta_{in}$=15° at 28 GHz, as shown in FIGS. 6A and 6B. In this regard, the pattern 3, which is formed in such a manner that the pattern is not interrupted even if the deviation occurs in the X-axis direction owing to the presence of a connection portion, has pass properties of −2.7 dB at $\theta_{in}$=0° and −3.0 dB at $\theta_{in}$=15°, as shown in FIGS. 7A and 7B. This is the same performance as that in the case of the ideally continuous parallel line pattern. That is, in the pattern 2 in which the pattern formed along the Y-axis direction has an interruption, the radio-wave transmissibility is reduced by reflecting radio waves easier, but in the pattern 3 in which the pattern formed along the Y-axis direction is properly connected, and it is possible to have good radio-wave transmissibility, similar to the pattern 1 in which the pattern formed along the Y-axis direction is ideally continuous.

A more preferred aspect of the first repeating pattern will be described below in detail.

The first repeating pattern includes at least two first unit patterns extending along the first axis direction. The first axis direction may be, for example, any linear direction on a surface on which the pattern is formed. The first axis direction may be adjusted according to a desired radio wave to be transmitted, and is preferably, for example, a direction perpendicular to a plane of polarization of the desired radio wave. As a more specific example, when the heat-ray reflecting substrate is set vertically to the ground and the first axis direction is set horizontally to the ground, high radio-wave transmissibility is likely to be obtained for vertically polarized radio waves. The first axis direction may be a direction along any curve within a scope of not impeding an effect of the present invention. The first repeating pattern may include only first unit patterns having the same shape, or may include a plurality of types of first unit patterns having different shapes.

A length of each first unit pattern along the first axis direction is not particularly limited, but may be, for example, equal to or less than a maximum length of a unit processing region along the first axis direction.

The first unit pattern includes the first line portion extending in the first axis direction. The first line portion is a portion of the first repeating pattern which mainly constitutes a line along the first axis direction. Therefore, a ratio of the length of the first line portion to the length of the first unit pattern along the first axis direction is preferably 90% or more, and more preferably 95% or more. The ratio of the length of the first line portion to the length of the first unit pattern is 100% or less.

The first unit pattern includes the first connection portion located on at least one end portion of the first line portion and connected to another first unit pattern of the at least two first unit patterns. The first connection portion includes a portion extending in the second axis direction different from the first axis direction, and has at least a part connected to the first line portion. Similar to the first axis direction, the second axis direction may be any linear direction or any direction along a curved line on the surface on which the pattern is formed, as long as the direction is different from the first axis direction. When the first connection portions are located on both ends of the first line portion, or when the first unit patterns having a plurality of different shapes are mixed in the first repeating pattern, it is unnecessary that the "second axis direction" of each of the first connection portions included in the first unit patterns is the same direction. That is, one first unit pattern or one first repeating pattern may have a plurality of first connection portions whose directions corresponding to the second axis direction are different from each other.

Figure 8:
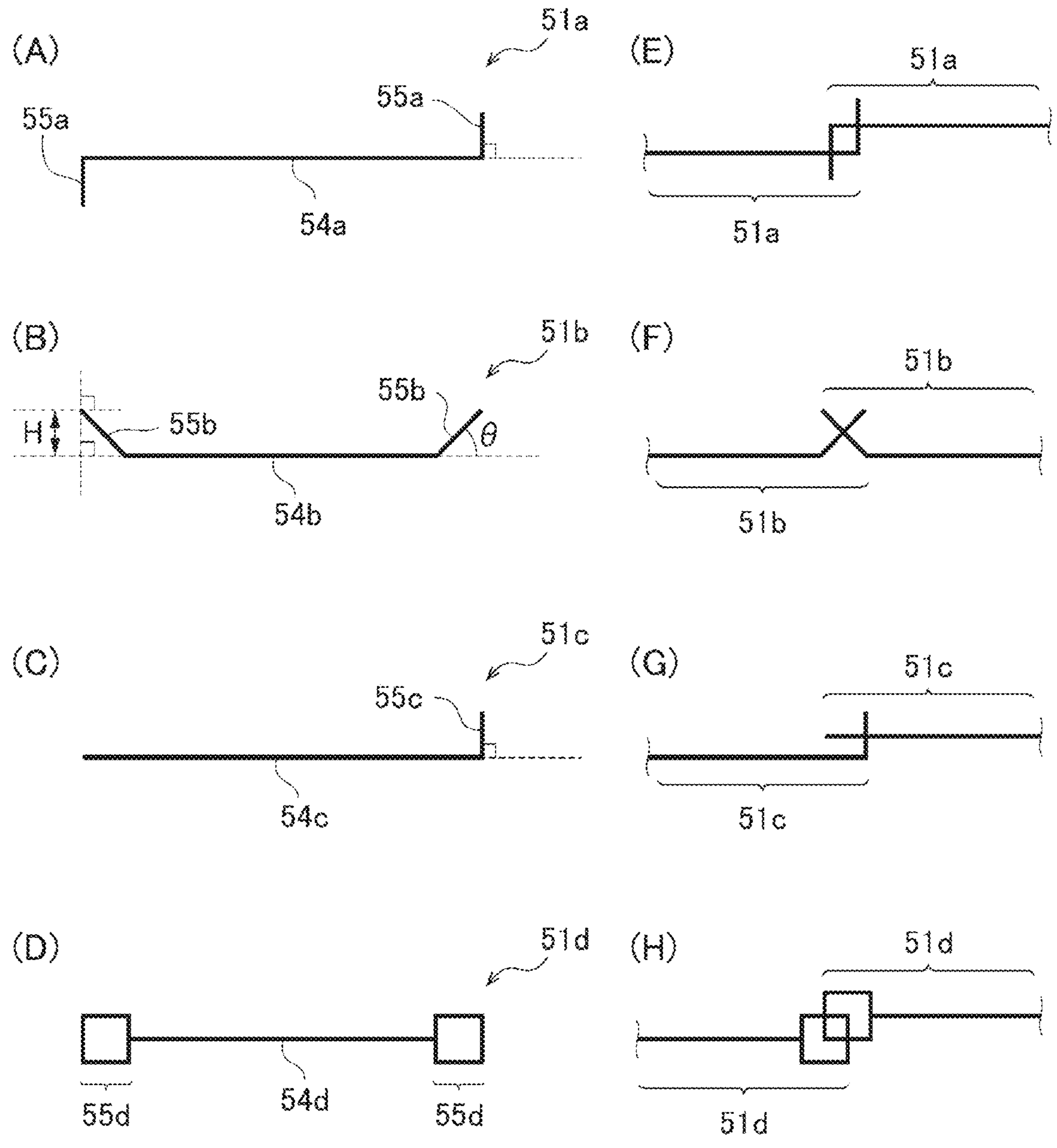
FIG. 8 is a diagram illustrating an embodiment of a first repeating pattern.

FIG. 8 is a diagram illustrating an embodiment of the first repeating pattern, in which each of (A) to (D) is a diagram illustrating an embodiment of the first unit pattern. Each of (E) to (H) of FIG. 8 is a diagram illustrating a form in which a plurality of the first unit patterns illustrated in (A) to (D) are connected via the first connection portion. In (A) to (D) of FIG. 8, first unit patterns 51*a*, 51*b*, 51*c*, and 51*d* include first line portions 54*a*, 54*b*, 54*c*, and 54*d*, and first connection portions 55*a*, 55*b*, 55*c*, and 55*d*, respectively. The first unit patterns 51*a*, 51*b*, and 51*d* include the first connection portions 55*a*, 55*b*, and 55*d* at both ends of the first line portions 54*a*, 54*b*, and 54*d*, respectively. The first unit pattern 51*c* includes the first connection portion 55*c* at one end portion of the first line portion.

An angle θ (°) between the first axis direction and the second axis direction is preferably 10°≤θ≤120°. In the present specification, the angle between the first axis direction and the second axis direction refers to a smaller one of the angle between a virtual straight line obtained by extending the first line portion in the first axis direction and the first connection portion in the second axis direction, that is, the angle is greater than 0° and 180° or less. For example, in FIG. 8, (A) is a diagram illustrating a case where θ is 90°, and (B) is a diagram illustrating a case where θ is 45°. θ is preferably in a range of 10°≤θ≤90°, more preferably in a range of 10°≤θ≤80°, particularly preferably in a range of 15°≤θ≤60°, and furthermore particularly preferably in a range of 15°≤θ≤45°. When θ is in the above range, the portion extending in the second axis direction of the first connection portion is likely to have a component parallel to the first axis direction and a component parallel to the direction perpendicular thereto in a good balance. Accordingly, it is easier to absorb the deviation of the pattern forming position in various directions. Alternatively, when θ is less than 90°, it is easier to prevent the slit portions from being formed to be crowded in a connection region of the first connection portion and another first unit pattern connected thereto, and an aesthetic appearance of the radio-wave transmitting region is improved.

When the first line portion has connection portions at both ends, angles of the respective connection portions may be the same or different, but as described below, it is preferable to set the first unit pattern to be axially symmetric or rotationally symmetric. That is, it is preferable to set the same angle θ.

The first connection portions are preferably provided on both end portions of the first line portion. As described above, in (A), (B), and (D) of FIG. 8, the first connection portions are provided on both end portions of the first line portion. As illustrated in (E), (F), and (H) of FIG. 8, when the first unit patterns each having the first connection portions at both end portions of the first line portion are connected to each other, each of these connection regions has two first connection portions that can easily absorb the deviation of the pattern forming position. Accordingly, it is easier to absorb the deviation of the pattern forming position in various directions.

The radio-wave transmitting region preferably includes a plurality of first repeating patterns aligned in parallel. As described above, one first repeating pattern can be equivalent to a single line extending along the first axis direction, as an example of an ideal continuous pattern. The radio-wave transmitting region includes the plurality of first repeating patterns aligned in parallel, so that a pattern equivalent to the plurality of lines aligned in parallel, that is, parallel lines can be formed. For example, in (C) of FIG. 1, a plurality of first repeating patterns 15 are aligned in parallel. The plurality of first repeating patterns aligned in parallel may include only first repeating patterns having the same shape, or may include a plurality of types of first repeating patterns having different shapes.

When the radio-wave transmitting region includes the plurality of first repeating patterns aligned in parallel, an interval between the first repeating patterns is preferably 100 μm to 10 mm. When the radio-wave transmitting region includes a periodic pattern formed by the slit portions, a period thereof may be adjusted to selectively transmit radio waves having a desired frequency or the like. Therefore, the interval between the first repeating patterns can be adjusted as appropriate according to properties of the radio waves to be transmitted. For example, when it is desired to transmit a high frequency band of several hundred MHz to 100 GHz, the interval between the first repeating patterns is preferably 100 μm or more, more preferably 200 μm or more, and furthermore preferably 300 μm or more. On the other hand, from the same viewpoint, the interval is preferably 10 mm or less, more preferably 4000 μm or less, furthermore preferably 2000 μm or less, and particularly preferably 1000 μm or less. The interval between the first repeating patterns refers to an average distance between the first line portions of the first repeating patterns in a direction perpendicular to the first axis direction.

When the radio-wave transmitting region includes the plurality of first repeating patterns aligned in parallel, the first connection portion is preferably not connected to another adjacent first repeating pattern. Accordingly, the length of the first repeating pattern in the direction perpendicular to the first axis direction is limited, and thus the shape of the first repeating pattern can be more ideally close to a continuous single line.

A length of the component perpendicular to the first axis direction of the first connection portion is preferably 10% to 80% of the interval between the first repeating patterns. When the length of the component perpendicular to the first axis direction is 10% or more of the interval between the first repeating patterns, a size of the connection portion is likely to be sufficient, and the deviation of the pattern forming position is more easily absorbed. Such a ratio of the length is more preferably 20% or more, and furthermore preferably 25% or more. On the other hand, by setting the ratio to be 80% or less, the shape of the first repeating pattern can be more ideally close to a continuous single line. The size of the first connection portion can be made smaller than a certain size, and thus a coverage of the heat-ray reflecting film in the radio-wave transmitting region can be relatively increased. This contributes to improving the heat-ray reflectance of the heat-ray reflecting substrate and improving forming efficiency of the slit portion. Such a ratio is more preferably 50% or less, furthermore preferably 45% or less, and particularly preferably 40% or less. The length of the component perpendicular to the first axis direction of the first connection portion refers to a length indicated by H in (B) of FIG. 8, for example.

The above ratio will be further described by assuming the following pattern. That is, it is assumed that in a plan view of the heat-ray reflecting substrate, the plurality of first repeating patterns in which the first unit patterns 51*b* in (B) of FIG. 8 are repeated along a left-right direction of the paper are repeated at a predetermined interval in an up-down direction of the paper to be aligned in parallel. If one of the first repeating patterns is taken as a reference pattern, the reference pattern may have another adjacent first repeating pattern on each of upper and lower sides thereof. The first connection portion 55*b* of the first unit pattern 51*b* included in the reference pattern has a component perpendicular to the first axis direction on an upper side as viewed from the first line portion 54*b*, but does not have such a component on a lower side. In this case, the ratio of the length of the component perpendicular to the first axis direction to the interval between the first repeating pattern and the adjacent first repeating pattern at the upper side is expressed as H/(interval between first repeating pattern and adjacent first repeating pattern at upper side). On the other hand, such a ratio is 0 for the adjacent first repeating pattern at the lower side. In this way, when the component perpendicular to the first axis direction of the first connection portion is only on one side of the direction perpendicular to the first axis direction (up-down direction) as seen from the first line portion, the ratio of the component perpendicular to the first axis direction to the interval between the first repeating pattern and the adjacent first repeating pattern on that side is preferably within the above range. On the other hand, if it is assumed that the first unit patterns 51*d* in (D) of FIG. 8 are repeatedly aligned in the same manner, it can be said that components perpendicular to the first axis direction of the first connection portions 55*d* are on both sides in the direction perpendicular to the first axis direction (up-down direction) as seen from the first line portion 54*d*. In this case, the ratio of the length of the component perpendicular to the first axis direction of the entire first connection portion 55*d* to a sum of the intervals between the first repeating pattern and the adjacent first repeating patterns at the upper side and the lower side is preferably within the above range.

The length of the component perpendicular to the first axis direction of the first connection portion depends on specific magnitude of the interval between the first repeating patterns, and is preferably 100 μm to 1000 μm from the same viewpoint as that of the above ratio. That is, the length of the component perpendicular to the first axis direction is preferably 100 μm or more, and more preferably 200 μm or more. The length of the component perpendicular to the first axis direction of the first connection portion is preferably 1000 μm or less, more preferably 700 μm or less, and furthermore preferably 400 μm or less.

The first unit pattern is preferably axially symmetric or rotationally symmetric. The first unit pattern being axially symmetric refers to that when the first unit pattern is inverted around a straight line, the figure before and after the inversion is unchanged. The first unit pattern being rotationally symmetric refers to that when the first unit pattern is rotated 180° around a symmetric point as the center of symmetry, the figure before and after the rotation is unchanged. The first unit patterns illustrated in (B) and (D) of FIG. 8 are both axially symmetric. The first unit patterns illustrated in (A) and (D) of FIG. 8 are both rotationally symmetric. Since the first unit patterns have such symmetry, the first unit patterns can be easily connected even if a device or a heat-ray reflecting substrate is rotated when forming the first repeating pattern. As illustrated in (E), (F), and (H) of FIG. 8, when the first unit patterns that are axially symmetric or rotationally symmetric are connected to each other, a shape of each of the connection regions is also likely to achieve symmetry, and the aesthetic appearance of the radio-wave transmitting region can be improved.

(Second Repeating Pattern)

In the heat-ray reflecting substrate, it is preferable that the radio-wave transmitting region further includes a second repeating pattern formed of the slit portion according to a desired pattern shape. Here, the second repeating pattern includes at least two second unit patterns along a third axis direction different from the first axis direction, each of the second unit patterns includes a second line portion extending in the third axis direction, and a second connection portion provided on at least one end portion of the second line portion and connected to another second unit pattern of the at least two second unit patterns, and the second connection portion includes a portion extending in a fourth axis direction different from the third axis direction, and has at least a part connected to the second line portion.

The second repeating pattern is similar to the first repeating pattern, except that a repeating direction of the second repeating pattern is along the third axis direction different from the first axis direction. The third axis direction is also defined in the same way as the first axis direction, except that the third axis direction is a direction different from the first axis direction.

Therefore, a preferred aspect of the second repeating pattern is the same as that of the first repeating pattern described above, but with the following substitutions. That is, the "first" in the first repeating pattern, the first unit pattern, the first line portion, and the first connection portion are respectively replaced with the "second", the first axis direction is replaced with the third axis direction, and the second axis direction is replaced with the fourth axis direction. The preferred aspect of the second repeating pattern is also exemplified below.

An angle θ (°) between the third axis direction and the fourth axis direction is preferably $10°\leq\theta\leq120°$, more preferably $10°\leq\theta\leq90°$, furthermore preferably $10°\leq\theta\leq80°$, particularly preferably $15°\leq\theta\leq60°$, and furthermore particularly preferably $15°\leq\theta\leq45°$. When θ is in the above range, the portion extending in the fourth axis direction of the second connection portion is likely to have a component parallel to the third axis direction and a component parallel to the direction perpendicular thereto in a good balance. Accordingly, it is easier to absorb the deviation of the pattern forming position in various directions. Alternatively, when θ is less than 90°, it is easier to prevent the slit portions from being formed to be crowded in a connection region of the second connection portion and another second unit pattern connected thereto, and an aesthetic appearance of the radio-wave transmitting region is improved.

When the radio-wave transmitting region includes the first repeating pattern and the second repeating pattern, it is preferable that at least one of the angle θ (°) between the first axis direction and the second axis direction or the angle θ (°) between the third axis direction and the fourth axis direction is within the above range.

The second connection portions are preferably located on both end portions of the second line portion. Accordingly, it is easier to absorb the deviation of the pattern forming position in various directions.

When the radio-wave transmitting region includes the first repeating pattern and the second repeating pattern, at least one of the first line portion or the second line portion preferably has the first connection portions or the second connection portions on both end portions.

The radio-wave transmitting region preferably includes a plurality of second repeating patterns aligned in parallel. Accordingly, a pattern equivalent to the plurality of lines aligned in parallel, that is, parallel lines can be formed by the second repeating patterns.

When the radio-wave transmitting region includes the first repeating pattern and the second repeating pattern, the radio-wave transmitting region preferably includes at least one of the plurality of first repeating patterns aligned in parallel or the plurality of second repeating patterns aligned in parallel.

When the radio-wave transmitting region includes the plurality of second repeating patterns aligned in parallel, an interval between the second repeating patterns can be adjusted as appropriate according to properties of the radio waves to be transmitted, and is preferably, for example, 100 μm to 10 mm. The interval between the first repeating patterns is preferably 100 μm or more, more preferably 200 μm or more, and furthermore preferably 300 μm or more. On the other hand, from the same viewpoint, the interval is preferably 10 mm or less, more preferably 4000 μm or less, furthermore preferably 2000 μm or less, and particularly preferably 1000 μm or less.

When the radio-wave transmitting region includes the plurality of first repeating patterns aligned in parallel and the plurality of second repeating patterns aligned in parallel, at least one of the interval between the first repeating patterns or the interval between the second repeating patterns is preferably within the above range.

The second connection portion is preferably not connected to another adjacent second repeating pattern. Accordingly, a length of the second repeating pattern in the direction perpendicular to the third axis direction is limited, and thus a shape of the second repeating pattern can be more close to an ideally continuous single line.

A length of the component perpendicular to the third axis direction of the second connection portion is preferably 10% to 80% to the interval between the second repeating patterns. When such a ratio is 10% or more, a size of the connection portion is likely to be sufficient, and the deviation of the pattern forming position is more easily absorbed. Such a ratio of the length is more preferably 20% or more, and furthermore preferably 25% or more. On the other hand, when the ratio is 80% or less, the shape of the second repeating pattern can be more close to an ideally continuous single line. The size of the second connection portion can be made smaller than a certain size, and thus a coverage area of the heat-ray reflecting film in the radio-wave transmitting region can be relatively increased. This contributes to improving the heat-ray reflectance of the heat-ray reflecting substrate and improving forming efficiency of the slit portion. Such a ratio is more preferably 50% or less, furthermore preferably 45% or less, and particularly preferably 40% or less.

When the radio-wave transmitting region includes the plurality of first repeating patterns aligned in parallel and the plurality of second repeating patterns aligned in parallel, in at least one of the first repeating patterns or the second repeating patterns, the length of the component perpendicular to the first axis direction of the first connection portion with respect to the interval between the first repeating patterns, or the length of the component perpendicular to the third axis direction of the second connection portion with respect to the interval between the second repeating patterns is preferably within the above range.

The second unit pattern is preferably axially symmetric or rotationally symmetric. Since the second unit patterns have such symmetry, the second unit patterns can be easily connected even if a device or a heat-ray reflecting substrate is rotated when forming the second repeating pattern. When the second unit patterns that are axially symmetric or rotationally symmetric are connected to each other, a shape of each of the connection regions is also likely to achieve symmetry, and the aesthetic appearance of the radio-wave transmitting region can be improved.

When the radio-wave transmitting region includes the first repeating pattern and the second repeating pattern, at least one of the first unit pattern or the second unit pattern is preferably axially symmetric or rotationally symmetric.

Figure 9:
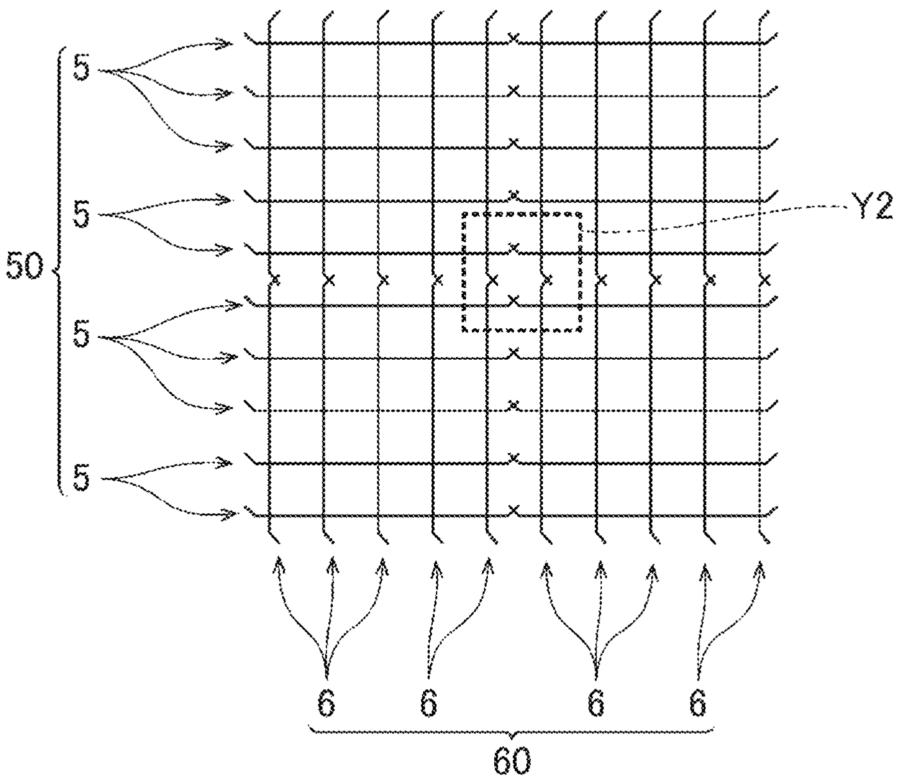
FIG. 9 is a diagram illustrating a grid-like pattern.
Figure 9:
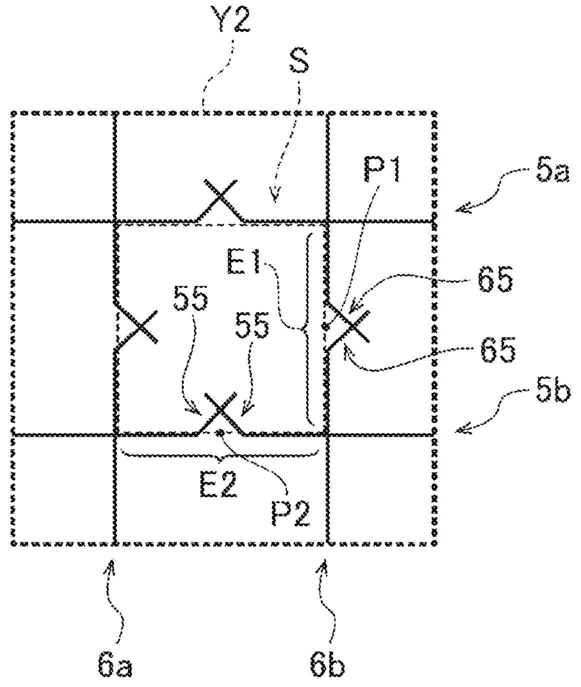

When the radio-wave transmitting region includes the plurality of first repeating patterns (first repeating pattern group) aligned in parallel and the plurality of second repeating patterns (second repeating pattern group) aligned in parallel, and the first repeating pattern group and the second repeating pattern group are formed to overlap each other, a grid-like pattern may be obtained in the overlapping region. For example, when the first axis direction and the third axis direction intersect perpendicularly, the grid-like pattern may be obtained in which squares or rectangles are periodically arranged. When the first axis direction and the third axis direction are not perpendicular to each other, the grid-like pattern may be obtained in which parallelograms are periodically arranged. (A) of FIG. 9 is a diagram illustrating the grid-like pattern that can be formed on the radio-wave transmitting region when the first axis direction and the third axis direction intersect perpendicularly. In (A) of FIG. 9, a first repeating pattern group 50 including a plurality of first repeating patterns 5 aligned in parallel and a second repeating pattern group 60 including a plurality of second repeating patterns 6 aligned in parallel are arranged to overlap each other.

When the radio-wave transmitting region includes the first repeating pattern and the second repeating pattern intersecting the first repeating pattern, the first connection portion is preferably not in contact with the second repeating pattern, and the second connection portion is preferably not in contact with the first repeating pattern. Accordingly, the slit portion can be prevented from being formed to be crowded in a partial region, and the aesthetic appearance of the radio-wave transmitting region can be improved.

When the radio-wave transmitting region includes a quadrangular pattern formed of two first repeating patterns aligned in parallel and adjacent to each other and two second repeating patterns aligned in parallel and adjacent to each other, the first connection portions are preferably not in contact with the second repeating patterns, and the second connection portions are preferably not in contact with the first repeating patterns, for the same reason as above. In this case, at least one of the first connection portion and the second connection portion is furthermore preferably located on a midpoint of at least one side forming the quadrangle. (B) of FIG. 9 is an enlarged diagram of a region Y2 in (A). For example, in (B) of FIG. 9, a first repeating pattern 5*a*, an adjacent first repeating pattern 5*b* aligned parallel thereto, a second repeating pattern 6*a*, and an adjacent second repeating pattern 6*b* aligned parallel thereto form a quadrangular pattern S. Second connection portions 65 are located on a midpoint P1 of a side E1 forming the quadrangle, and first connection portions 55 are located on a midpoint P2 of a side E2. The same applies to opposite sides of the sides E1 and E2. That is, in the quadrangular pattern S illustrated in (B) of FIG. 9, the first connection portions or the second connection portions are located on each of midpoints of all the four sides. By locating at least one of the first connection portions or the second connection portions at the midpoint of at least one side forming the quadrangle, the quadrangle has symmetry, and thus the aesthetic appearance of the radio-wave transmitting region can be improved. Here, the first connection portions being located on the midpoint of the side refers to that a straight line perpendicular to the side and passing through the midpoint of the side is in contact with or intersects with the first connection portions included in the first unit patterns that constitute the side. The same is applied to the second connection portions.

When the radio-wave transmitting region includes both the first repeating pattern and the second repeating pattern, the shapes of the repeating patterns may be the same or different from each other. When the radio-wave transmitting region includes both the first repeating pattern group and the second repeating pattern group, the interval between the first repeating patterns and the interval between the second repeating patterns may be the same or different from each other. These can be adjusted as appropriate according to the desired radio-wave transmission performance and other properties. The radio-wave transmitting region may include a slit portion other than those forming the first repeating pattern and the second repeating pattern within a scope of not imparing the effect of the present invention. For example, a third repeating pattern including at least two third unit patterns extending along a fifth axis direction different from both the first axis direction and the third axis direction may be included. The third repeating pattern may be defined in the same manner as the first repeating pattern and the second repeating pattern, except that the repeating direction is different.

According to the present embodiment, by changing arrangement of the first repeating pattern and the second repeating pattern formed as necessary, various patterns can be formed on the radio-wave transmitting region. For example, the parallel line pattern and the grid-like pattern described above, and a circular pattern can be formed. In addition, by further providing the third repeating pattern described above, a pattern in which triangles are periodically arranged or various other patterns can be formed. In the present embodiment, a repeating period thereof, a grid shape, and the like can be changed as appropriate. According to the present embodiment, a heat-ray reflecting substrate in which freedom in the pattern selection is excellent, interruption of each pattern is prevented, and reliability is excellent can be obtained. Next, other configurations of the heat-ray reflecting substrate will be described.

(Dielectric Substrate)

The dielectric substrate in the present embodiment is not particularly limited as long as the substrate is made of a dielectric material, and may be, for example, a glass substrate made of soda lime glass, non-alkali glass, quartz glass, or the like. The glass substrate may be physically strengthened or chemically strengthened. The glass substrate may be made of a single piece of glass, or may be made by laminating a plurality of pieces of glass with a film made of resin (resin film) or the like sandwiched therebetween.

The dielectric substrate in the present embodiment is not limited to a glass substrate, and may be, for example, a substrate made of a resin (resin substrate) or a composite substrate in which a resin substrate and a glass substrate are laminated. Examples of the resin substrate include substrates made of acrylic resins such as polymethyl methacrylate, aromatic polycarbonate resins such as polyphenylene carbonate, and aromatic polyester resins such as polyethylene terephthalate (PET).

Physical properties of the dielectric substrate in the present embodiment, such as radio-wave transmissibility and heat-ray reflectance, are not particularly limited as long as the effect of the present invention is exerted, and may be adjusted as appropriate according to physical properties required for the heat-ray reflecting substrate to be finally obtained.

In a case where a glass substrate is used as the dielectric substrate in the present embodiment, the following configuration is preferable, for example. A specific gravity of the glass substrate is preferably 2.4 or more and 3.0 or less. A Young's modulus of the glass substrate is preferably 60 GPa or more and 100 GPa or less. An average thermal expansion coefficient of the glass substrate from 50° C. to 350° C. is preferably $50\times 10^{-7}$/° C. or more and $120\times10^{-7}$/° C. or less. If the glass substrate satisfies these physical property requirements, the glass substrate can be used sufficiently and suitably as a window material.

A shape of the dielectric substrate in the present embodiment is not particularly limited, and may be flat or curved. A thickness of the dielectric substrate in the present embodiment is also not particularly limited, and may be adjusted as appropriate according to a desired strength, lightness, or the like.

(Heat-Ray Reflecting Film)

The heat-ray reflecting film is not particularly limited as long as this film can impart a function of reflecting heat rays to the heat-ray reflecting substrate. A typical example of a film that can impart the function of reflecting heat rays is a conductive film.

A term "conductive film" in the present specification refers to a film having an electrical resistivity of $10^0$ [Ω·cm] or less at 20° C. A component of the conductive film is not particularly limited, and the conductive film preferably contains, as a main component, a metal such as silver, aluminum, indium tin oxide (ITO), tin oxide doped with at least one of fluorine or antimony ($SnO_2$:F, Sb), titanium nitride, niobium nitride, chromium nitride, zirconium nitride, and hafnium nitride (hereinafter, also referred to as "conductive film component group A") that have excellent heat-ray reflectance. In the present specification, the main component refers to a content of 50 at % or more of total components. That is, the conductive film of the present embodiment contains at least one selected from the group consisting of the conductive film component group A, and a content of the conductive film component group A in the conductive film of the present embodiment is preferably 50 at % or more in total.

In order for the radio-wave transmitting region to exert excellent heat-ray reflectance, the conductive film preferably contains at least one of silver or aluminum as the main component, the conductive film more preferably contains silver as the main component (that is, contains 50 at % or more), and furthermore preferably contains 95 at % or more of silver.

The conductive film containing silver as the main component may contain one or more additive elements such as gold, palladium, copper, bismuth, neodymium, and platinum. By containing such additive elements in the conductive film containing silver as the main component, diffusion of silver can be prevented and moisture resistance can be improved. The additive elements are not limited to those exemplified above, and any element can be added as long as the effect of the present invention is exerted.

The thickness of the heat-ray reflecting film (conductive film) of the present embodiment is not particularly limited, and may be adjusted as appropriate according to the radio-wave transmissibility at a predetermined frequency, heat-ray reflectance, visible light transmissibility, appearance, and the like required for the heat-ray reflecting substrate to be finally obtained. The thickness of the heat-ray reflecting film is usually 1 nm or more, preferably 3 nm or more, more preferably 5 nm or more, and furthermore preferably 6 nm or more. The thickness is preferably 100 nm or less, more preferably 50 nm or less, and furthermore preferably 20 nm or less. The heat-ray reflecting film may include only one layer (single layer), or may include a plurality of layers such as two or three layers, and if the plurality of layers are present, the plurality of layers may be adjacent to each other in the thickness direction of the heat-ray reflecting film, or may be separated by another layer interposed between the layers. In the case where the heat-ray reflecting film includes the plurality of layers, a total thickness may be within the above range.

The present heat-ray reflecting substrate may be provided with a film (another film) different from the heat-ray reflecting film within a scope of exerting the effect of the present invention.

The present heat-ray reflecting substrate may include, for example, a metal oxide layer or a metal nitride layer, and preferably includes at least one of a metal oxide layer or a metal nitride layer. In particular, the heat-ray reflecting film is preferable in terms of durability if the heat ray reflecting film has a layer structure in which the conductive film is sandwiched between the other layers such as a metal oxide layer or a metal nitride layer. Examples of the metal oxide layer include layers containing metal oxides including, as the main component, aluminum oxide, zinc oxide, indium oxide, titanium oxide, niobium oxide, tin oxide, bismuth oxide, tantalum oxide, tungsten oxide, zirconium oxide, silicon oxide, and the like. Among these, the metal oxide layer preferably contains zinc oxide as the main component from a viewpoint of being compatible with silver which is the preferred component of the conductive film and further increasing the durability of the conductive film. Examples of the metal nitride layer include layers containing metal nitrides including, as the main component, silicon nitride ($Si_3N_4$), aluminum nitride (AlN), and the like. In the radio-wave transmitting region of the present heat-ray reflecting substrate, the slit portion does not have the heat-ray reflecting film at least, but the slit portion may have another film within the scope of exerting the effect of the present invention. For example, when another film is further formed on the heat-ray reflecting substrate on which the slit portion is formed in advance, the slit portion may have no heat-ray reflecting film but may have another film.

(Properties)

The present heat-ray reflecting substrate preferably has the following properties.

In the present heat-ray reflecting substrate, the radio-wave transmitting region exhibits excellent transmissibility for a radio wave having a frequency of preferably about several hundred MHz to several hundred GHz, for example, about 300 MHz to 300 GHz, more preferably about 3 GHz to 100 GHz, and furthermore preferably about 6 GHz to 40 GHz. Specifically, by properly changing the pattern formed of the slit portion in the radio-wave transmitting region, the radio-wave transmitting region can exhibit excellent transmissibility for radio waves of various frequency bands, for example, 25 GHz to 45 GHz, 3 GHz to 6 GHz, 6 GHz to 15 GHz, 50 GHz to 350 GHz, or 50 GHz to 100 GHz. More specifically, the present heat-ray reflecting substrate of the present embodiment is less likely to impede the transmission of a radio wave having a predetermined frequency in the radio-wave transmitting region. Accordingly, it is easy to obtain a heat-ray reflecting substrate having the radio-wave transmissibility required for an application such as a window glass.

In the heat-ray reflecting substrate of the present embodiment, for example, a radio-wave transmission loss for a radio wave having a frequency of 28 GHz in the radio-wave transmitting region is preferably 3 dB or less, more preferably 2 dB or less, and furthermore preferably 1 dB or less. Similarly, a radio-wave transmission loss for a radio wave having a frequency of 79 GHz is preferably 3 dB or less, more preferably 2 dB or less, and furthermore preferably 1 dB or less.

The radio-wave transmission loss for the radio wave having a frequency of 28 GHz (79 GHz) in the radio-wave transmitting region is a value obtained by subtracting the radio-wave transmission loss for the radio wave having a frequency of 28 GHz (79 GHz) in the dielectric substrate from the radio-wave transmission loss for the radio wave having a frequency of 28 GHz (79 GHz) of the entire heat-ray reflecting substrate in the radio-wave transmitting region. The radio-wave transmission loss is a value measured, for example, by a free space method.

Accordingly, although the radio-wave transmission losses for the radio waves having frequencies of 28 GHz and 79 GHz have been described as an example, it is preferable that the radio-wave transmission loss similar to that described above can be obtained not only in the 28 GHz and 79 GHz bands but also in frequency bands of several hundred MHz to 100 GHz.

The present heat-ray reflecting substrate is preferably excellent in the heat-ray reflectance. The heat-ray reflectance can be evaluated, for example, by the solar reflectance specified in JIS R3106 (1998). The solar reflectance of the radio-wave transmitting region of the present heat-ray reflecting substrate is preferably 30% or more, more preferably 35% or more, and furthermore preferably 40% or more.

(Application)

The present heat-ray reflecting substrate is suitable for use in applications requiring the heat-ray reflectance and the radio-wave transmissibility. Examples of such applications include a window glass for architectural or vehicle applications. In particular, the present heat-ray reflecting substrate is suitable for the application of the window glass in which an area and a maximum side length of the radio-wave transmitting region are relatively large and thus it is difficult to form a pattern on the radio-wave transmitting region in a single step, and is more suitable for a window glass for an architectural application. That is, the present heat-ray reflecting substrate or a window glass including the same has a length of the maximum side of the radio-wave transmitting region on a main surface of, for example, preferably 300 mm or more, and more preferably 500 mm or more. An area of the radio-wave transmitting region on the main surface is preferably 900 $cm^2$ or more, and more preferably 2500 $cm^2$ or more. When the area and the length of the maximum side of the radio-wave transmitting region on the main surface are within the above ranges, the present heat-ray reflecting substrate or the window glass including the same can more effectively obtain the effect of the present invention. However, in the scope of obtaining the effect of the present invention, the area and the length of the maximum side of the radio-wave transmitting region can be appropriately selected according to the application or the like, and may be outside the above ranges. The maximum side of the radio-wave transmitting region refers to a long side of the region if the region is rectangular, and refers to a long side of a rectangle circumscribing the region if the region is any other shape.

The window glass including the present heat-ray reflecting substrate has excellent reliability because the pattern included in the radio-wave transmitting region is prevented from being interrupted. In the window glass including the present heat-ray reflecting substrate, the shape or the like of the pattern formed on the radio-wave transmitting region can be selected with high freedom according to the desired properties or the like while ensuring the reliability described above.

(Method for Manufacturing Heat-Ray Reflecting Substrate)

The present heat-ray reflecting substrate can be manufactured by a method including, for example, preparing a heat-ray reflecting substrate having a heat-ray reflecting film formed on at least one main surface of a dielectric substrate, and forming, on at least a part of the at least one main surface in a plan view, a slit portion where the heat-ray reflecting film is not present, thereby forming a radio-wave transmitting region. In such a method, the slit portion is formed such that the obtained radio-wave transmitting region includes at least a first repeating pattern formed by the slit portion.

The method of preparing the heat-ray reflecting substrate having the heat-ray reflecting film formed on the at least one main surface of the dielectric substrate is not particularly limited, and may be a method using a commercially available product, or a method of forming a heat-ray reflecting film on at least one main surface of a dielectric substrate.

The method of forming the heat-ray reflecting film on the at least one main surface of the dielectric substrate is not particularly limited, and can use, for example, physical vapor deposition (vacuum vapor deposition, ion plating, magnetron sputtering, and the like), chemical vapor deposition (thermal CVD, plasma CVD, photo CVD, and the like), and ion beam sputtering. When a film forming area is large, direct current magnetron sputtering, direct current pulse magnetron sputtering, or alternating current dual magnetron sputtering is preferable because uniformity of a thickness is easily controlled and productivity is excellent.

The heat-ray reflecting film in the present embodiment may be formed directly or indirectly on the dielectric substrate. The method of indirectly forming the heat-ray reflecting film on the dielectric substrate is not particularly limited, and may include a method of attaching, to a dielectric substrate, a resin film on which a heat-ray reflecting film is formed.

In the embodiment illustrated in FIG. 1 and FIG. 2, the heat-ray reflecting film 13 (including the radio-wave transmitting region A) is formed on the entirety of one main surface of the dielectric substrate 11, but may be formed only on a part thereof.

The method of forming the slit portion to form the radio-wave transmitting region is not particularly limited, and examples thereof include a method of forming a continuous (solid) heat-ray reflecting film in a predetermined region on the dielectric substrate and then partially removing the heat-ray reflecting film to form the slit portion, and a method of forming a heat-ray reflecting film only on a predetermined portion on the dielectric substrate to obtain a radio-wave transmitting region. Among these, from viewpoints of cost and ease of production, the method of forming the heat-ray reflecting film and then partially removing the heat-ray reflecting film to form the slit portion is preferred.

Examples of the method of partially removing the heat-ray reflecting film include laser etching and photolithography, and from viewpoints of cost and practicality, the method using laser etching is preferred.

Figure 10:
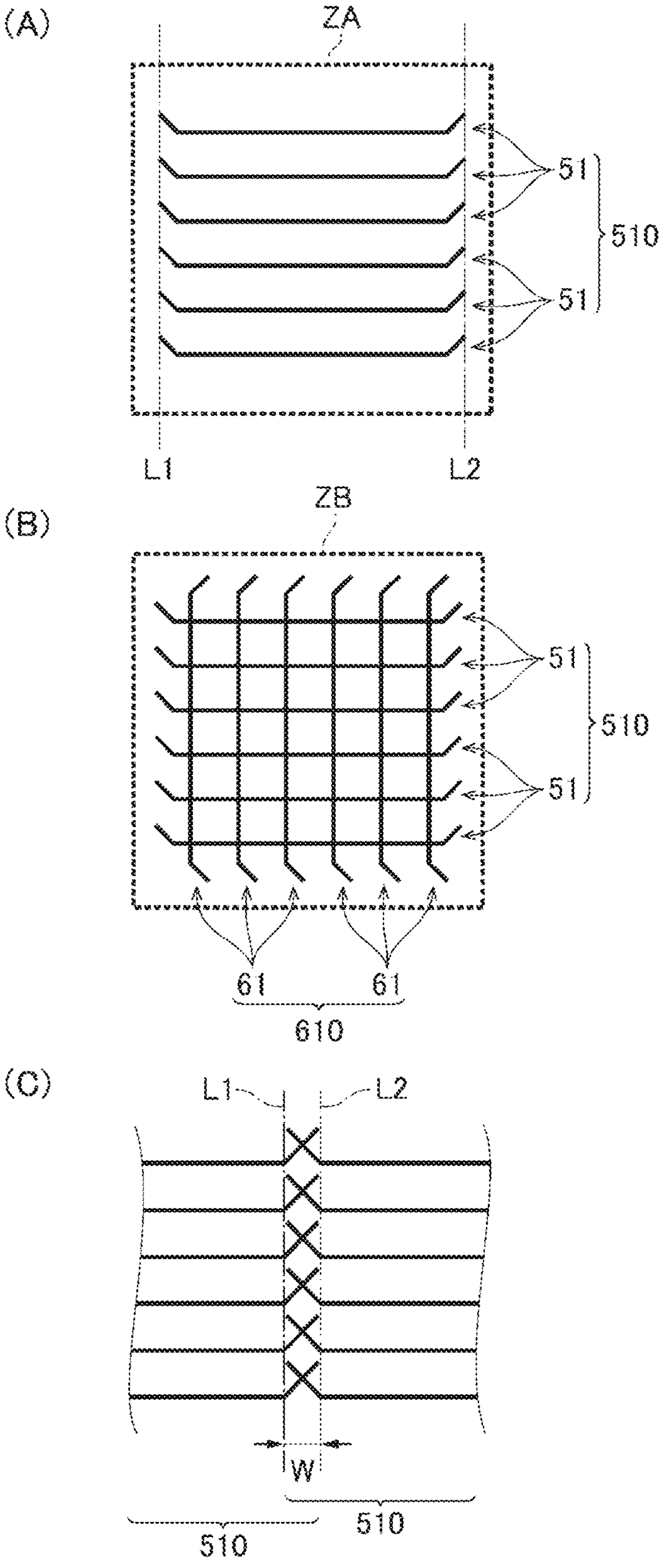
FIG. 10 is a diagram schematically illustrating a pattern that matches a size of a unit processing region.

As described above, in order to make the pattern formed of the slit portion in the radio-wave transmitting region to be in the aspect described above, for example, the heat-ray reflecting film is partially removed by the following method. That is, in a region where the radio-wave transmitting region is to be formed, a pattern that matches a size of a unit processing region is formed a plurality of times, and the obtained patterns are arranged continuously to form a continuous pattern. FIG. 10 is a diagram schematically illustrating the pattern that matches the size of the unit processing region. For example, (A) of FIG. 10 is a diagram illustrating the "pattern that matches the size of the unit processing region" when a parallel line pattern is to be formed in the radio-wave transmitting region, and such a pattern is preferably a first unit pattern group 510 in which a plurality of first unit patterns 51 are arranged in parallel in a unit processing region ZA. (B) of FIG. 10 is a diagram illustrating a "pattern that matches the size of the unit processing region" when a grid-like pattern is to be formed in the radio-wave transmitting region, and such a pattern is preferably a composite unit pattern group in which the first unit pattern group 510 described above and a second unit pattern group 610 in which a plurality of second unit patterns 61 are arranged in parallel are superimposed. Although depending on a desired pattern shape, a predetermined unit pattern group can be formed in the unit processing region in one step accordingly, and this step can be performed a plurality of times to continuously arrange the unit pattern groups, thereby forming a desired pattern such as the parallel line pattern or grid-like pattern described above. A specific aspect of each unit pattern included in the unit pattern group and a preferred aspect of an interval thereof are the same as those in the preferred aspect of the first repeating pattern or the second repeating pattern described above. The unit pattern group is more preferably axially symmetric or rotationally symmetric. By making the unit pattern group axially symmetric or rotationally symmetric, even if the substrate is rotated or an orientation is changed when the unit pattern groups are arranged continuously, it is unnecessary to rotate the unit pattern group accordingly, or the number of rotations can be reduced, and thus a continuous pattern can be formed more easily.

When arranging a plurality of unit pattern groups continuously, a connection end portion of the unit pattern group having the first connection portion or the second connection portion is preferably disposed to overlap a connection end portion of another unit pattern group arranged adjacently. In (A) of FIG. 10, L1 and L2 respectively indicate connection end portions of the first unit pattern group 510. (C) of FIG. 10 is a diagram illustrating a case where two first unit pattern groups 510 are arranged continuously. In (C) of FIG. 10, the connection end portion L1 of one first unit pattern group 510 is arranged to overlap the connection end portion L2 of the other first unit pattern group 510 arranged adjacently. In this case, an overlapping width W is preferably 50 μm or more, more preferably 100 μm or more, and furthermore preferably 200 μm or more from the viewpoint of preventing the interruption of the pattern. On the other hand, W is preferably 2000 μm or less, more preferably 1000 μm or less, and furthermore preferably 500 μm or less. In other words, a width of overlapping between the end portions of two consecutive (connected) first unit patterns in the first repeating pattern is preferably the same as the overlapping width W described above. This also applies to a width of overlapping between the end portions of two consecutive second unit patterns in the second repeating pattern.

In this way, the present heat-ray reflecting substrate is obtained by forming the slit portion where the heat-ray reflecting film is not present and forming the radio-wave transmitting region. The unit pattern group exemplified above as the "pattern that matches the size of the unit processing region" includes the plurality of first unit patterns and second unit patterns, but the "pattern that matches the size of the unit processing region" may be various patterns, such as a pattern implemented by only one first unit pattern depending on properties of a processing device and a desired pattern.

The method for manufacturing the present heat-ray reflecting substrate is not limited to the method exemplified above, and may be changed as appropriate within the scope of obtaining the effect of the present invention.

Although various embodiments have been described above with reference to the drawings, it is needless to say that the present invention is not limited to such examples. It is obvious for a person skilled in the art that various modifications and variations can be made within the range described in the scope of claims and it is understood that such modifications and variations naturally belong to the technical scope of the present invention. Further, the components described in the above embodiment may be combined in any manner without departing from the gist of the invention.

The present application is based on a Japanese Patent Application (No. 2022-087165) filed on May 27, 2022, contents of which are incorporated herein by reference.

REFERENCE SIGNS LIST

10, 10*a* heat-ray reflecting substrate
11 dielectric substrate
13 heat-ray reflecting film
14 slit portion
5, 5*a*, 5*b*, 15 first repeating pattern
50 first repeating pattern group
151*a*, 151*b*, 51, 51*a*, 51*b*, 51*c*, 51*d* first unit pattern
154*a*, 154*b*, 54*a*, 54*b*, 54*c*, 54*d* first line portion
155*a*, 155*b*, 55, 55*a*, 55*b*, 55*c*, 55*d* first connection portion
510 first unit pattern group
6, 6*a*, 6*b* second repeating pattern
60 second repeating pattern group
65 second connection portion
610 second unit pattern group
A radio-wave transmitting region
Za, Zb, Zc, ZA, ZB unit processing region

The invention claimed is:

1. A heat-ray reflecting substrate comprising:
a dielectric substrate; and
a heat-ray reflecting film formed on at least one main surface of the dielectric substrate, wherein
the heat-ray reflecting substrate has a radio-wave transmitting region in at least a part of the at least one main surface in a plan view,
the radio-wave transmitting region includes a first repeating pattern formed of a slit portion where the heat-ray reflecting film is not present,
the first repeating pattern includes at least two first unit patterns extending along a first axis direction,
each of the first unit patterns includes a first line portion extending in the first axis direction, and a first connection portion provided on at least one end portion of the first line portion and connected to another first unit pattern of the at least two first unit patterns, and the first connection portion includes a portion extending in a second axis direction different from the first axis direction, at least a part of the first connection portion is connected to the first line portion, and at least one end portion of the first connection portion is an open end.

2. The heat-ray reflecting substrate according to claim 1, wherein an angle θ (°) between the first axis direction and the second axis direction is $10° \leq \theta \leq 120°$.

3. The heat-ray reflecting substrate according to claim 1, wherein the first connection portion is provided on each of two end portions of the first line portion.

4. The heat-ray reflecting substrate according to claim 1, wherein the radio-wave transmitting region includes a plurality of the first repeating patterns aligned in parallel.

5. The heat-ray reflecting substrate according to claim 4, wherein the first connection portion is not connected to another adjacent first repeating pattern.

6. The heat-ray reflecting substrate according to claim 4, wherein a length of a component, which is perpendicular to the first axis direction, of the first connection portion is 10% to 80% of an interval between the first repeating patterns.

7. The heat-ray reflecting substrate according to claim 1, wherein each of the first unit patterns is axially symmetric or rotationally symmetric.

8. The heat-ray reflecting substrate according to claim 1, wherein the radio-wave transmitting region further includes a second repeating pattern formed of the slit portion, the second repeating pattern includes at least two second unit patterns along a third axis direction different from the first axis direction, each of the second unit patterns includes a second line portion extending in the third axis direction, and a second connection portion provided on at least one end portion of the second line portion and connected to another second unit pattern of the at least two second unit patterns, and the second connection portion includes a portion extending in a fourth axis direction different from the third axis direction, at least a part of the second connection portion is connected to the second line portion, and at least one end portion of the second connection portion is an open end.

9. The heat-ray reflecting substrate according to claim 8, wherein an angle θ (°) between the third axis direction and the fourth axis direction is $10° \leq \theta \leq 120°$.

10. The heat-ray reflecting substrate according to claim 8, wherein the second connection portion is provided on each of two end portions of the second line portion.

11. The heat-ray reflecting substrate according to claim 8, wherein the radio-wave transmitting region includes a plurality of the second repeating patterns aligned in parallel.

12. The heat-ray reflecting substrate according to claim 11, wherein the second connection portion is not connected to another adjacent second repeating pattern.

13. The heat-ray reflecting substrate according to claim 11, wherein a length of a component, which is perpendicular to the third axis direction, of the second connection portion is 10% to 80% of an interval between the second repeating patterns.

14. The heat-ray reflecting substrate according to claim 8, wherein each of the second unit patterns is axially symmetric or rotationally symmetric.

15. The heat-ray reflecting substrate according to claim 8, wherein the radio-wave transmitting region includes a quadrangular pattern formed of the two adjacent first repeating patterns aligned in parallel and the two adjacent second repeating patterns aligned in parallel, and at least one of the first connection portion and the second connection portion is located on a midpoint of at least one side forming the quadrangular shape.

16. The heat-ray reflecting substrate according to claim 1, wherein the radio-wave transmitting region has a radio-wave transmission loss of 3 dB or less with respect to a radio wave having a frequency of 28 GHz.

17. A window glass comprising the heat-ray reflecting substrate according to claim 1.

18. A heat-ray reflecting substrate comprising:

a dielectric substrate; and a heat-ray reflecting film formed on at least one main surface of the dielectric substrate, wherein the heat-ray reflecting substrate has a radio-wave transmitting region in at least a part of the at least one main surface in a plan view, the radio-wave transmitting region includes a first repeating pattern formed of a slit portion where the heat-ray reflecting film is not present, the first repeating pattern includes at least two first unit patterns extending along a first axis direction, each of the first unit patterns includes a first line portion extending in the first axis direction, and a first connection portion provided on at least one end portion of the first line portion and connected to another first unit pattern of the at least two first unit patterns, the first connection portion includes a portion extending in a second axis direction different from the first axis direction, and at least a part of the first connection portion is connected to the first line portion, the radio-wave transmitting region includes a plurality of the first repeating patterns aligned in parallel, and the first connection portion is not connected to another adjacent first repeating pattern.

19. A heat-ray reflecting substrate comprising:

a dielectric substrate; and a heat-ray reflecting film formed on at least one main surface of the dielectric substrate, wherein the heat-ray reflecting substrate has a radio-wave transmitting region in at least a part of the at least one main surface in a plan view, the radio-wave transmitting region includes a first repeating pattern formed of a slit portion where the heat-ray reflecting film is not present, the first repeating pattern includes at least two first unit patterns extending along a first axis direction, each of the first unit patterns includes a first line portion extending in the first axis direction, and a first connection portion provided on at least one end portion of the first line portion and connected to another first unit pattern of the at least two first unit patterns, the first connection portion includes a portion extending in a second axis direction different from the first axis direction, and at least a part of the first connection portion is connected to the first line portion, the radio-wave transmitting region further includes a second repeating pattern formed of the slit portion, the second repeating pattern includes at least two second unit patterns along a third axis direction different from the first axis direction, each of the second unit patterns includes a second line portion extending in the third axis direction, and a second connection portion provided on at least one end portion of the second line portion and connected to another second unit pattern of the at least two second unit patterns, the second connection portion includes a portion extending in a fourth axis direction different from the third axis direction, and at least a part of the second connection portion is connected to the second line portion, the radio-wave transmitting region includes a plurality of the second repeating patterns aligned in parallel, and the second connection portion is not connected to another adjacent second repeating pattern.

20. A heat-ray reflecting substrate comprising:

a dielectric substrate; and a heat-ray reflecting film formed on at least one main surface of the dielectric substrate, wherein the heat-ray reflecting substrate has a radio-wave transmitting region in at least a part of the at least one main surface in a plan view, the radio-wave transmitting region includes a first repeating pattern formed of a slit portion where the heat-ray reflecting film is not present, the first repeating pattern includes at least two first unit patterns extending along a first axis direction, each of the first unit patterns includes a first line portion extending in the first axis direction, and a first connection portion provided on at least one end portion of the first line portion and connected to another first unit pattern of the at least two first unit patterns, the first connection portion includes a portion extending in a second axis direction different from the first axis direction, and at least a part of the first connection portion is connected to the first line portion, the radio-wave transmitting region further includes a second repeating pattern formed of the slit portion, the second repeating pattern includes at least two second unit patterns along a third axis direction different from the first axis direction, each of the second unit patterns includes a second line portion extending in the third axis direction, and a second connection portion provided on at least one end portion of the second line portion and connected to another second unit pattern of the at least two second unit patterns, the second connection portion includes a portion extending in a fourth axis direction different from the third axis direction, and at least a part of the second connection portion is connected to the second line portion, and the radio-wave transmitting region includes a quadrangular pattern formed of the two adjacent first repeating patterns aligned in parallel and the two adjacent second repeating patterns aligned in parallel, and at least one of the first connection portion and the second connection portion is located on a midpoint of at least one side forming the quadrangular shape.

* * * * *